(12) United States Patent
Inagaki et al.

(10) Patent No.: US 6,657,637 B1
(45) Date of Patent: Dec. 2, 2003

(54) MOVING IMAGE COMBINING APPARATUS COMBINING COMPUTER GRAPHIC IMAGE AND AT LEAST ONE VIDEO SEQUENCE COMPOSED OF A PLURALITY OF VIDEO FRAMES

(75) Inventors: Satoru Inagaki, Suita (JP); Kenjirou Tsuda, Katano (JP); Yoshihisa Nishigori, Ikeda (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/508,227

(22) PCT Filed: Jul. 29, 1999

(86) PCT No.: PCT/JP99/04086

§ 371 (c)(1),
(2), (4) Date: Mar. 6, 2000

(87) PCT Pub. No.: WO00/07364

PCT Pub. Date: Feb. 10, 2000

(30) Foreign Application Priority Data

Jul. 30, 1998 (JP) .......................................... 10/215737

(51) Int. Cl.$^7$ ................................................ G09G 5/00
(52) U.S. Cl. ....................... 345/629; 345/630; 345/632; 345/633; 345/634; 345/418; 345/419; 348/586; 348/589; 348/600; 348/584
(58) Field of Search ................................. 345/418, 419, 345/581, 625, 626, 629, 630, 632, 633, 634; 348/586, 589, 600, 584

(56) References Cited

U.S. PATENT DOCUMENTS

| | | | | |
|---|---|---|---|---|
| 4,734,764 A | * | 3/1988 | Pocock et al. ................. | 358/86 |
| 5,014,128 A | * | 5/1991 | Chen .......................... | 358/160 |
| 5,027,212 A | * | 6/1991 | Marlton et al. ............. | 358/183 |
| 5,519,449 A | * | 5/1996 | Yanai et al. ................. | 348/598 |
| 5,594,467 A | * | 1/1997 | Marlton et al. ............. | 345/115 |
| 5,608,864 A | * | 3/1997 | Bindlish et al. ............. | 395/507 |
| 5,680,175 A | | 10/1997 | Yanai et al. | |
| 5,796,991 A | * | 8/1998 | Shimizu ...................... | 395/500 |
| 5,889,499 A | * | 3/1999 | Nally et al. .................... | 345/7 |
| 5,900,917 A | | 5/1999 | Yanai et al. | |
| 6,020,932 A | * | 2/2000 | Kurashige et al. .......... | 348/584 |
| 6,037,983 A | * | 3/2000 | Au et al. ..................... | 348/399 |
| 6,144,390 A | * | 11/2000 | Ensor .......................... | 345/473 |
| 6,227,974 B1 | * | 5/2001 | Eilat et al. ..................... | 463/40 |
| 6,323,861 B1 | * | 11/2001 | Carraro et al. .............. | 345/428 |

FOREIGN PATENT DOCUMENTS

| | | |
|---|---|---|
| EP | 583061 | 2/1994 |
| EP | 841811 | 5/1995 |
| JP | 3163595 | 7/1991 |
| JP | 5233199 | 9/1993 |
| JP | 7306953 | 11/1995 |
| WO | 9908178 | 2/1999 |

OTHER PUBLICATIONS

"MPEG–4: Audio/video and synthetic graphics/audio for mixed media," by P. K. Doenges et al., Signal Processing: Image Communication 9, (1997) pp. 433–463.

"MPEG–4 Systems, concepts and implementation," by F. Casalino et al., Lecture Notes in Computer Science, May 26, 1998, pp 504–517.

* cited by examiner

*Primary Examiner*—Michael Razavi
*Assistant Examiner*—Daniel J Chung

(57) ABSTRACT

A coordinate light source calculating unit 103 calculates 3D coordinates for points forming one or more objects and performs clipping. A rendering unit 104 performs rendering and outputs the formed CG image to a frame buffer 108. The coordinate light source calculating unit 103 calculates 3D coordinates forming a video display surface. A perspective projection unit 105 calculates 2D coordinates for each point forming the video display surface. An image decoder 106 decodes a video frame, and an image transform unit 107 transforms this image and outputs it to the frame buffer 108, enabling the video frame to be pasted onto the CG image.

19 Claims, 30 Drawing Sheets

10 MOVING IMAGE COMBINING APPARATUS

FIG. 3

201 OBJECT TABLE

| OBJECT NAME (211) | OUTLINE COORDINATES (212) | LOCATION COORDINATES (213) | VIDEO DISPLAY SURFACE COORDINATES (214) |
|---|---|---|---|
| TELEVISION | (0, 0, 0)<br>(10, 0, 0)<br>(0, 0, 5)<br>(10, 0, 5)<br>⋮ | (500, 200, 50) | (0, 0, 0)<br>(10, 0, 0)<br>(0, 0, 5)<br>(10, 0, 5) |
| PICTURE FRAME | ⋮ | ⋮ | — |
| DOOR | ⋮ | ⋮ | — |
| WINDOW | ⋮ | ⋮ | — |
| ROOM | ⋮ | ⋮ | — |

FIG. 11
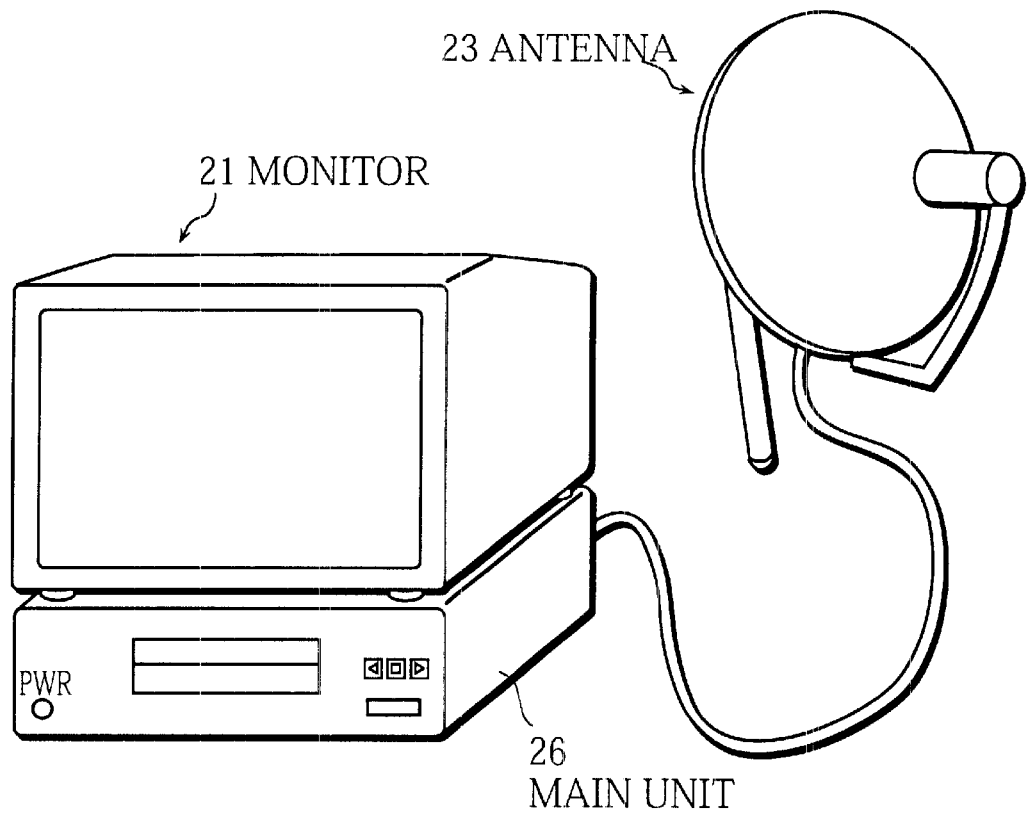
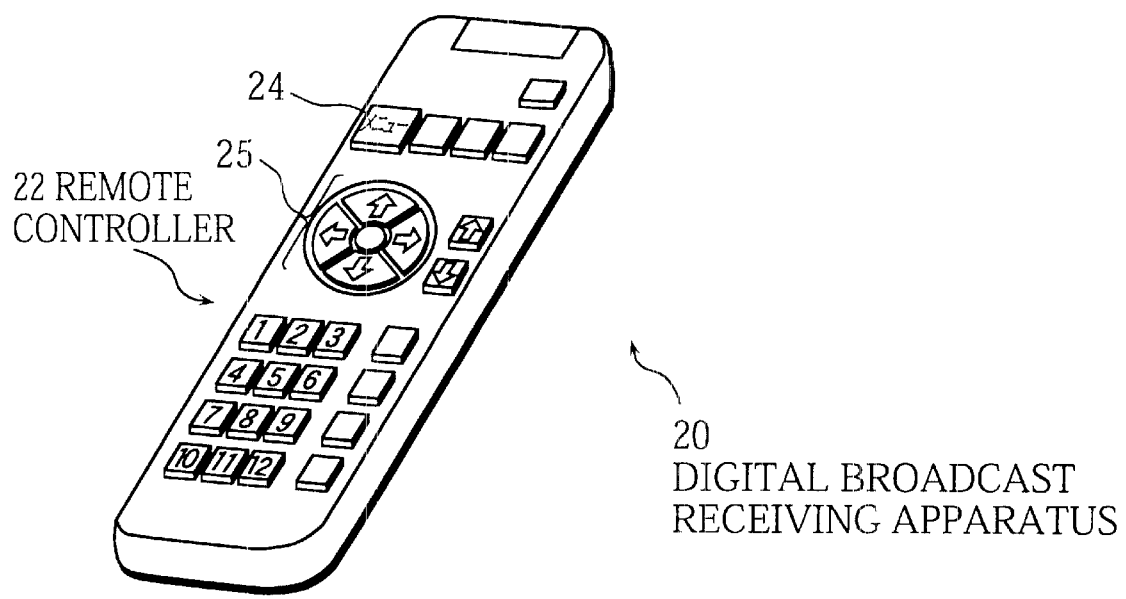

MOVING IMAGE COMBINING APPARATUS COMBINING COMPUTER GRAPHIC IMAGE AND AT LEAST ONE VIDEO SEQUENCE COMPOSED OF A PLURALITY OF VIDEO FRAMES

TECHNICAL FIELD

The present invention relates to a moving image combining apparatus combining computer graphics with video images.

RELATED ART

The following processing is conventionally performed when combining and displaying computer graphics and video images in a virtual space displayed by a computer using three-dimensional (hereafter 3D) graphics. A computer graphics (hereafter CG) image is generated by performing graphics-generating calculations using coordinate values showing locations and outlines for objects in a virtual 3D space. A video frame is extracted from a video sequence, and pasted onto the generated CG image using a method known as texture mapping. The resulting image is then displayed. High-speed repetition of this processing sequence for generating of a CG image, extracting of a video frame, pasting the video frame onto the CG image and displaying the resulting image enables CG images on which video frames have been pasted to be displayed sequentially, giving the appearance of a moving image.

However, the respective display rates for computer graphics and video images prior to combining are not necessarily identical. In a video sequence, a fixed number of frames can be displayed during a fixed time (this is hereafter to as the display rate). One standard for the video image display rate is 30 frames per second. In contrast, for computer graphics, the calculation time required to generate a CG image from coordinate values for object locations and outlines varies according to the number of objects to be displayed. As a result, achieving a uniform display rate is normally difficult.

Suppose the video image and computer graphics display rates are respectively 30 and 10 frames per second and moving images are combined at the computer graphics display rate. This means that, of the 30 video frames that can potentially be displayed in one second, only the 10 frames coinciding with display times of CG images can be displayed. Consequently, the remaining 20 frames cannot be displayed, so that the movement of the video sequence is jerky.

If moving images are combined at the video image display rate, however, the calculation required to generate a CG image cannot be completed in the interval between the display of consecutive video frames, meaning that it may not be possible to generate a CG image on every occasion.

DISCLOSURE OF THE INVENTION

In order to overcome the above problems, an object of the present invention is to provide a moving image combining apparatus combining computer graphics and video images at their respective display rates, a moving image combining method, and a recording medium recording a program for combining moving images.

An invention achieving the above object is a moving image combining apparatus combining computer graphics images (hereafter referred to as CG images) and at least one video sequence composed of a plurality of video frames, the moving image combining apparatus including the following. An information storage unit storing object information showing an outline and location for at least one object in three-dimensional (3D) space, a video obtaining unit obtaining from an external source at least one video sequence composed of a plurality of video frames generated at a fixed video display rate, an image storage unit, a receiving unit for receiving position information showing a position of a moving viewpoint, a graphics generating unit for generating CG images one at a time at a graphics display rate and, on completing the generation of a CG image, writing the CG image into the image storage unit, the CG image obtained by projecting each object whose outline and location is shown by the object information onto a projection surface, as seen from a current position of the moving viewpoint shown by the position information, and a video frame generating unit for fetching at least one video frame from the at least one video sequence at the video display rate and writing the fetched at least one video frame over a CG image, the CG image being stored in the image storage unit immediately prior to the time that the at least one video frame was fetched.

This construction enables generating of CG images and decoding of video frames to be performed in parallel using separate processes, and the generated CG image and still video to be combined in the storage unit. As a result, computer graphics and video images can be combined at their respective display rates.

The graphics generating unit may further perform rendering on each generated CG image, and write the rendered CG images into the image storage unit.

This construction enables rendering to be performed on a CG image, so that realistic graphics can be obtained.

Here, the following construction may also be used. Each object includes at least one video display area. The moving image combining apparatus combines, on at least one video screen located on the projection surface, at least one video sequence and a CG image, each video screen corresponding to a video display area. The object information includes information showing an outline and location for each video display area. The graphics generating unit further calculates screen information showing an outline and location for each video screen, each video screen obtained by projecting a video display area shown by an outline and location in the object information onto the projection surface. The video frame generating unit overwrites fetched video frames at each location shown by the screen information, so that each fetched video frame fits an outline shown in the screen information.

This construction enables a video sequence to be combined on a video screen of an object.

The video frame generating unit may also be constructed so that it generates transformed video frames by transforming the fetched video frames to fit an outline shown in the screen information; and overwrites the transformed video frames into the image storage unit.

This construction enables a video frame to be transformed to fit the video screen of the object, enabling the video sequence to be combined more realistically.

The following construction may also be used. Each object has a plurality of video display areas. The video obtaining unit obtains a plurality of video sequences from an external source. The moving image combining apparatus combines, on each of a plurality of video screens on a projection surface, one of the video sequences with a CG image, each video screen corresponding to one of the plurality of video display areas. The object information includes information showing outlines and locations for a plurality of video display areas. The graphics generating unit calculates screen information for each piece of information showing the outline and location for one of the plurality of video display areas. The video frame generating unit fetches video frames from each of the plurality of video sequences, and overwrites fetched video frames from the different video sequences at the different locations shown by the plurality of pieces of screen information, so that the fetched video frames fit the outlines shown in the screen information.

This construction enables video sequences to be combined on each of a plurality of video screens, when an object has a plurality of video display areas.

The video frame generating unit may also include the following. A priority ranking determining unit for determining a priority ranking for each video screen based on the plurality of pieces of calculated screen information. A video decoding unit for obtaining video frames from each of the plurality of video sequences, based on the determined priority ranking. A masking location calculating unit for calculating locations to be masked on each video screen, based on the plurality of pieces of calculated screen information and the priority ranking determined for each video screen. A masking unit for masking the transformed video frames at the calculated locations. Here, the video frame generating unit overwrites the transformed video frames which have been masked into the image storage unit.

This construction enables priority rankings to be determined according to video screens of objects, video frames to be obtained from video sequences based on the priority rankings, and masking to be performed on each video screen, so that video sequences can be combined more realistically.

The priority ranking determining unit may determine priority rankings using the plurality of pieces of calculated screen information, with video screens nearer to the viewpoint having a higher priority ranking.

This construction enables video screens nearer to a viewpoint to be given a higher priority ranking, so that video sequences can be combined more realistically.

The priority ranking determining unit may determine priority rankings using the plurality of pieces of calculated screen information, with video screens calculated as having a larger surface area having a higher priority ranking.

This construction enables video screens with a larger area to be given a higher priority ranking, so that a higher quality picture can be obtained.

The video decoding unit may obtain all of the video frames from a video sequence with the highest priority ranking, and omit more video frames from video sequences with lower priority rankings.

This construction enables a greater number of frames to be skipped at lower priority rankings, so that the picture quality of decoded video frames can be adjusted according to the priority ranking.

The video decoding unit may include an image quality adjustment unit reducing luminance of obtained video frames, and does not reduce the luminance of video frames from the video sequence with the highest priority ranking, while reducing the luminance of video frames from video sequences with lower priority rankings.

This construction enables luminance to be decreased at lower priority rankings, so that flickering is not noticeable for lower-ranked video display surfaces likely to have a low display rate.

The invention may also be a moving image combining apparatus combining three-dimensional CG images and at least one video sequence composed of a plurality of video frames. The moving image combining apparatus includes the following. An information storage unit for storing object information showing an outline and location for each object, and an outline and location for at least one video display area for each object, a video obtaining unit for obtaining from an external source at least one video sequence composed of a plurality of video frames generated at a fixed video display rate, a CG image storage unit, a video frame storage unit, an image storage unit, a receiving unit for receiving position information showing a position of a moving viewpoint, a graphics generating unit for generating CG images one at a time at a graphics display rate and on completing the generation of a CG image, writing the CG image into the CG image storage unit, the CG image obtained by projecting each object whose outline and location is shown by the object information onto a projection surface, as seen from a current position of the moving viewpoint shown by the position information; and calculating screen information showing an outline and location for at least one video screen obtained by projecting each video display area shown by an outline and location in the object information onto the projection surface, a video frame generating unit for fetching at least one video frame from the at least one video sequence at the video display rate and overwriting the fetched at least one video frame into the video frame storage unit, and a selecting unit for selecting elements forming still images from the at least one video frame written in the video frame storage unit and a CG image written in the CG image storage unit, the CG image being written in the CG image storage unit immediately prior to the time that the at least one video frame was fetched; and writing the selected elements in the image storage unit.

This construction enables generating of CG images and decoding of video frames to be performed in parallel as separate processes. As a result, computer graphics and video images can be combined at their respective display rates, and images can be combined via a selection signal, so that the construction of the apparatus can be simplified.

The CG image storage unit may include a first graphics storage unit and a second graphics storage unit and the video frame storage unit may include a first video storage unit and a second video storage unit. The graphics generating unit writes obtained CG images alternately in the first and second graphics storage units. The video frame generating unit writes obtained video frames alternately in the first and second graphics storage units. The selecting unit reads a CG image from the second graphics storage unit while the graphics generating unit is writing a CG image into the first graphics storage unit, and reads a CG image from the first graphics storage unit while the graphics generating unit is writing a CG image into the second graphics storage unit. The selecting unit also reads a video frame from the second video storage unit while the video frame generating unit is writing a video frame into the first video storage unit, and reads a video frame from the first video storage unit while the video frame generating unit is writing a video frame into the second video storage unit. Then the selecting unit selects elements forming still images from the read CG images and video frames.

This construction enables generating of CG images, decoding of video frames, and combining of generated CG images with video frames to be performed in parallel as separate processes. As a result, computer graphics and video images can be combined at their respective display rates, and generating of CG images, decoding of video frames and combining of CG images with video frames can be performed more quickly.

The graphics generating unit may further perform rendering on each generated CG image, and write the rendered CG images into the image storage unit.

This construction enables graphics to be rendered, so that computer graphics can be generated more realistically.

The video frame generating unit may generate transformed video frames by transforming the fetched video frames to fit an outline shown in the screen information; and overwrite the transformed video frames into the image storage unit.

This construction enables video frames to be transformed to fit the outline of the video screen of each object, so that a video sequence can be combined more realistically.

The following construction may also be used. Each object has a plurality of video display areas. The video obtaining unit obtains a plurality of video sequences from an external source. The moving image combining apparatus combines, on each of a plurality of video screens on a projection surface, one of the video sequences with a CG image, each video screen corresponding to one of the plurality of video display areas. The object information includes information showing outlines and locations for a plurality of video display areas. The graphics generating unit calculates screen information for each piece of information showing the outline and location for one of the plurality of video display areas. The video frame generating unit fetches video frames from each of the plurality of video sequences, and overwrites fetched video frames from the different video sequences at the different locations shown by the plurality of pieces of screen information, so that the fetched video frames fit the outlines shown in the screen information.

This construction enables video images to be combined on a plurality of video screens of objects, when an object has a plurality of video display areas.

The video frame generating unit may include the following. A priority ranking determining unit for determining a priority ranking for each video screen based on the plurality of pieces of calculated screen information. A video decoding unit for obtaining video frames from each of the plurality of video sequences, based on the determined priority ranking. A masking location calculating unit for calculating locations to be masked on each video screen, based on the plurality of pieces of calculated screen information and the priority ranking determined for each video screen. A masking unit for masking the transformed video frames at the calculated locations. Here, the video frame generating unit overwrites the transformed video frames which have been masked into the image storage unit.

This construction enables priority rankings to be determined according to video screens of objects, video frames to be obtained from video sequences based on the priority rankings, and masking to be performed on each video screen, so that video sequences can be combined more realistically.

The priority ranking determining unit may determine priority rankings using the plurality of pieces of calculated screen information, with video screens nearer to the viewpoint having a higher priority ranking.

This construction enables video screens nearer the viewpoint to be given a higher priority ranking, so that video sequences can be combined more realistically.

The priority ranking determining unit may determine priority rankings using the plurality of pieces of calculated screen information, with video screens calculated as having a larger surface area having a higher priority ranking.

This construction enables video screens with larger areas to receive a higher priority ranking, so that picture quality can be increased.

The video decoding unit may obtain all of the video frames from a video sequence with the highest priority ranking, and omit more video frames from video sequences with lower priority rankings.

This construction enables a larger number of frames to be skipped at lower priority rankings, so that picture quality for decoded video frames can be adjusted according to the priority ranking.

The video decoding unit may include an image quality adjustment unit reducing luminance of obtained video frames, and does not reduce the luminance of video frames from the video sequence with the highest priority ranking, while reducing the luminance of video frames from video sequences with lower priority rankings.

This construction enables luminance to be decreased at lower priority rankings, so that flicker is not noticeable for lower-ranked video display surfaces likely to have a low display rate.

A moving image combining method for combining CG images and at least one video sequence composed of a plurality of video frames may also be used. The moving image combining method is used by a moving image combining apparatus having an information storage unit and an image storage unit, the information storage unit storing object information showing an outline and location for at least one object in three-dimensional space. The moving image combining method includes the following. A video obtaining step obtaining from an external source at least one video sequence composed of a plurality of video frames generated at a fixed video display rate. A receiving step receiving position information showing a position of a moving viewpoint. A graphics generating step generating CG images one at a time at a graphics display rate and, on completing the generation of a CG image, writing the CG image into the image storage unit, the CG image obtained by projecting each object whose outline and location is shown by the object information onto a projection surface, as seen from a current position of the moving viewpoint shown by the position information. A video frame generating step fetching at least one video frame from the at least one video sequence at the video display rate and writing the fetched at least one video frame over a CG image, the CG image being stored in the image storage unit immediately prior to the time that the at least one video frame was fetched.

When using this method, the same effects are apparent as for the moving image combining apparatus.

A moving image combining method for combining, on an video display area, CG images and at least one video sequence composed of a plurality of video frames may also be used. The moving image combining method is used by a moving image combining apparatus having an information storage unit, a CG image storage unit, a video frame storage unit, and an image storage unit, the information storage unit storing object information showing an outline and location for at least one object, and an outline and location for a video screen for each object, in three-dimensional space. The moving image combining method includes the following. A video obtaining step obtaining from an external source at least one video sequence composed of a plurality of video frames generated at a fixed video display rate. A receiving step receiving position information showing a position of a moving viewpoint. A graphics generating step generating CG images one at a time at a graphics display rate and, on completing the generation of a CG image, writing the CG image into the graphics storage unit, the CG image obtained by projecting each object whose outline and location is shown by the object information onto a projection surface, as seen from a current position of the moving viewpoint shown by the position information and calculating screen information showing an outline and location for at least one video screen, the video screen obtained by projecting the at least one video display area shown by an outline and location in the object information onto the projection surface. A video frame generating step fetching at least one video frame from the at least one video sequence at the video display rate and overwriting the fetched at least one video frame in the video frame storage unit. A selecting step selecting elements forming still images from the at least one video frame written in the video frame storage unit and a CG image written in the CG image storage unit, the CG image being written in the CG image storage unit immediately prior to the time that the at least one video frame was fetched, and writing the selected elements in the image storage unit.

When using this method, the same effects are apparent as for the moving image combining apparatus.

The invention may also be realized using a recording medium recording a moving image combining program combining CG images and at least one video sequence composed of a plurality of video frames. The moving image combining program used by a computer having an information storage unit and an image storage unit, the information storage unit storing object information showing an outline and location for at least one object in three-dimensional space. The moving image combining program including the following. A video obtaining step obtaining from an external source at least one video sequence composed of a plurality of video frames generated at a fixed video display rate. A receiving step receiving position information showing a position of a moving viewpoint. A graphics generating step generating CG images one at a time at a graphics display rate and, on completing the generation of a CG image, writing the CG image into the image storage unit, the CG image obtained by projecting each object whose outline and location is shown by the object information onto a projection surface, as seen from a current position of the moving viewpoint shown by the position information. A video frame generating step fetching at least one video frame from the at least one video sequence at the video display rate and writing the fetched at least one video frame over a CG image, the CG image being stored in the image storage unit immediately prior to the time that the at least one video frame was fetched.

When this program is executed by a computer, the same effects are apparent as for the moving image combining apparatus.

The invention may also use a recording medium recording a moving image combining program combining, on a video display area, CG images and at least one video sequence composed of a plurality of video frames. The moving image combining program used by a computer having an information storage unit, a CG image storage unit, a video frame storage unit, and an image storage unit, the information storage unit storing object information showing an outline and location for at least one object, and an outline and location for a video display area for each object, in three-dimensional space. The moving image combining program includes the following. A video obtaining step obtaining from an external source at least one video sequence composed of a plurality of video frames generated at a fixed video display rate. A receiving step receiving position information showing a position of a moving viewpoint. A graphics generating step generating CG images one at a time at a graphics display rate and, on completing the generation of a CG image, writing the CG image into the graphics storage unit, the CG image obtained by projecting each object whose outline and location is shown by the object information onto a projection surface, as seen from a current position of the moving viewpoint shown by the position information and calculating screen information showing an outline and location for at least one video screen, the video screen obtained by projecting the at least one video display area shown by an outline and location in the object information onto the projection surface. A video frame generating step fetching at least one video frame from the at least one video sequence at the video display rate and overwriting the fetched at least one video frame in the video frame storage unit. A selecting step selecting elements forming still images from the at least one video frame written in the video frame storage unit and a CG image written in the CG image storage unit, the CG image being written in the CG image storage unit immediately prior to the time that the at least one video frame was fetched, and writing the selected elements in the image storage unit.

When this program is executed by a computer, the same effects are apparent as for the moving image combining apparatus.

BRIEF DESCRIPTION OF THE DRAWINGS

FIG. 3 shows an example of an object table recorded in a data storage unit 102;

FIG. 11 shows an external view of a digital broadcast receiving apparatus 20 in an alternative to the first embodiment of the present invention;

BEST MODE FOR CARRYING OUT THE INVENTION

The following is a detailed description of the embodiments of the present invention with reference to the drawings.

1 First Embodiment

The following is a description of a moving image combining apparatus 10 in a first embodiment of the present invention.

1.1 Structure of Moving Image Combining Apparatus 10

Figure 1:
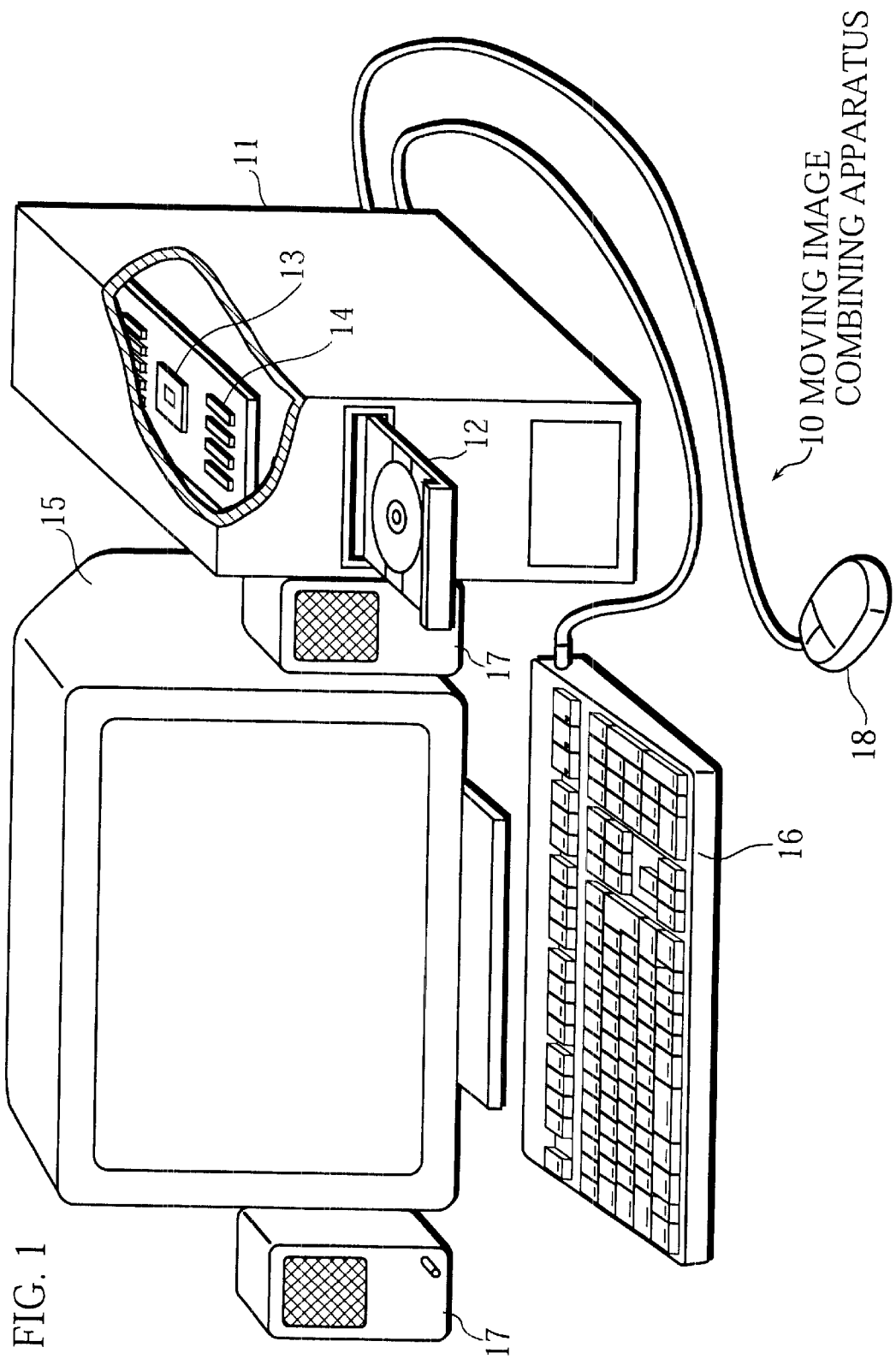
FIG. 1 shows an external view of a moving image combining apparatus 10 in a first embodiment of the present invention.

As shown in FIG. 1, the moving image combining apparatus 10 is constructed from a main unit 11, a CD-ROM drive 12 in which a CD-ROM is loaded, a processor 13 for executing programs, a semiconductor memory 14 storing programs and data, a monitor 15, a keyboard 16, speakers 17 and a mouse 18. The moving image combining apparatus 10 reads object information for 3D objects and video image information recorded on the CD-ROM, generates a graphic image, pastes a video image onto the generated graphic image and displays the combined image on the monitor 15.

Figure 2:
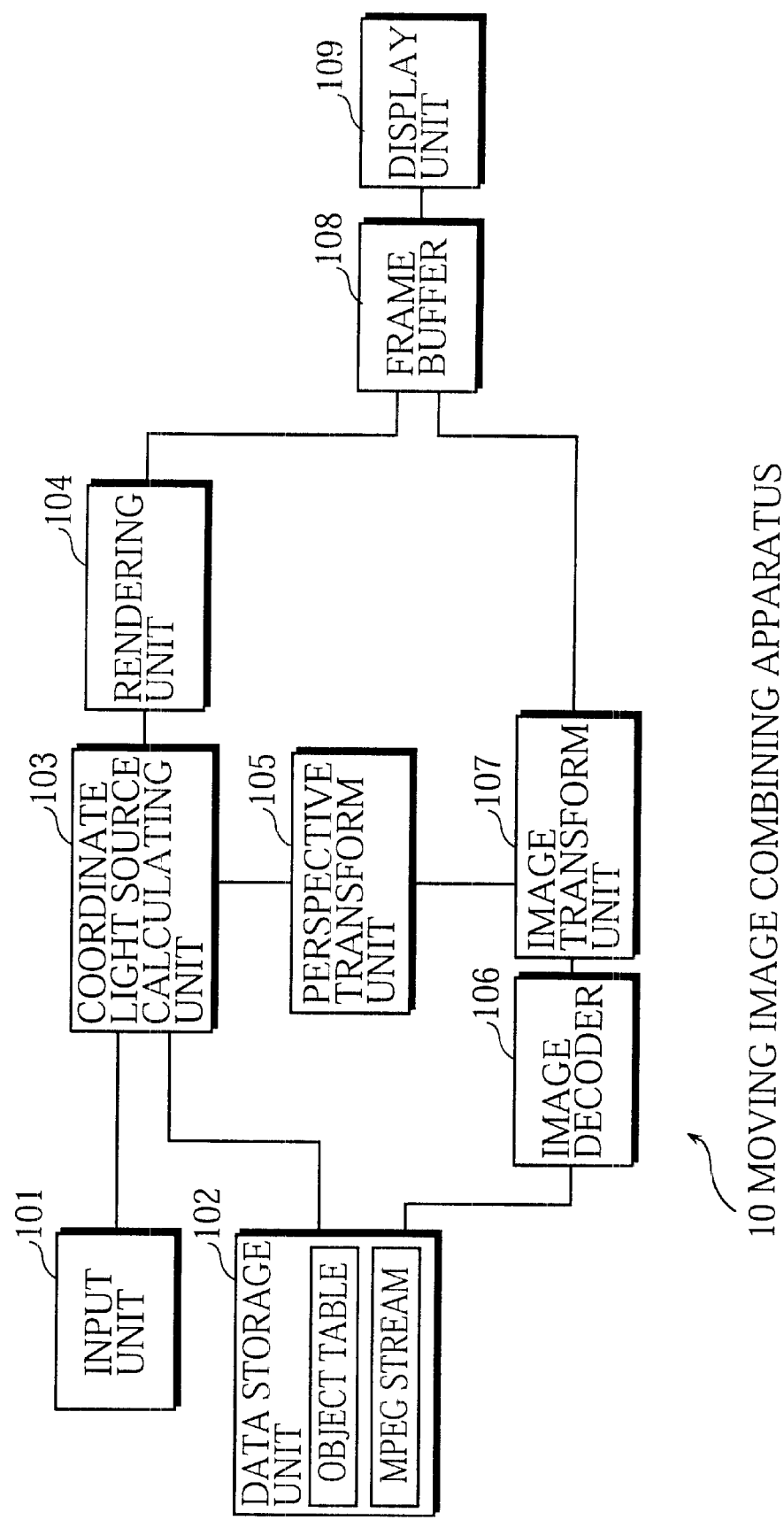
FIG. 2 is a block diagram showing the construction of the moving image combining apparatus 10.

FIG. 2 is a functional block diagram of the moving image combining apparatus 10. In the drawing, the moving image combining apparatus 10 is constructed from an input unit 101, a data storage unit 102, a coordinate light source calculating unit 103, a rendering unit 104, a perspective transform unit 105, an image decoder 106, an image transform unit 107, a frame buffer 108 and a display unit 109.

(1) Input Unit 101

The input unit 101 includes the keyboard 16, the mouse 18, and the like.

The input unit 101 receives input from buttons 321 to 327 in a navigation instruction menu 303. The buttons 321 to 327 receive forward, back, left, right, up, down and operation end instructions respectively. When the input unit 101 receives an input from one of the buttons 321 to 327, it outputs information showing forward, back, left, right, up, down or operation end to the coordinate light source calculating unit 103.

The input unit 101 receives input from the buttons 321 to 327 at a rate of ten times per second.

(2) Data Storage Unit 102 The data storage unit 102 is constructed from a CD-ROM and the CD-ROM drive 12, in which the CD-ROM is loaded. Data is recorded on the CD-ROM, and the CD-ROM drive 12 reads this data as requested.

Figure 4:
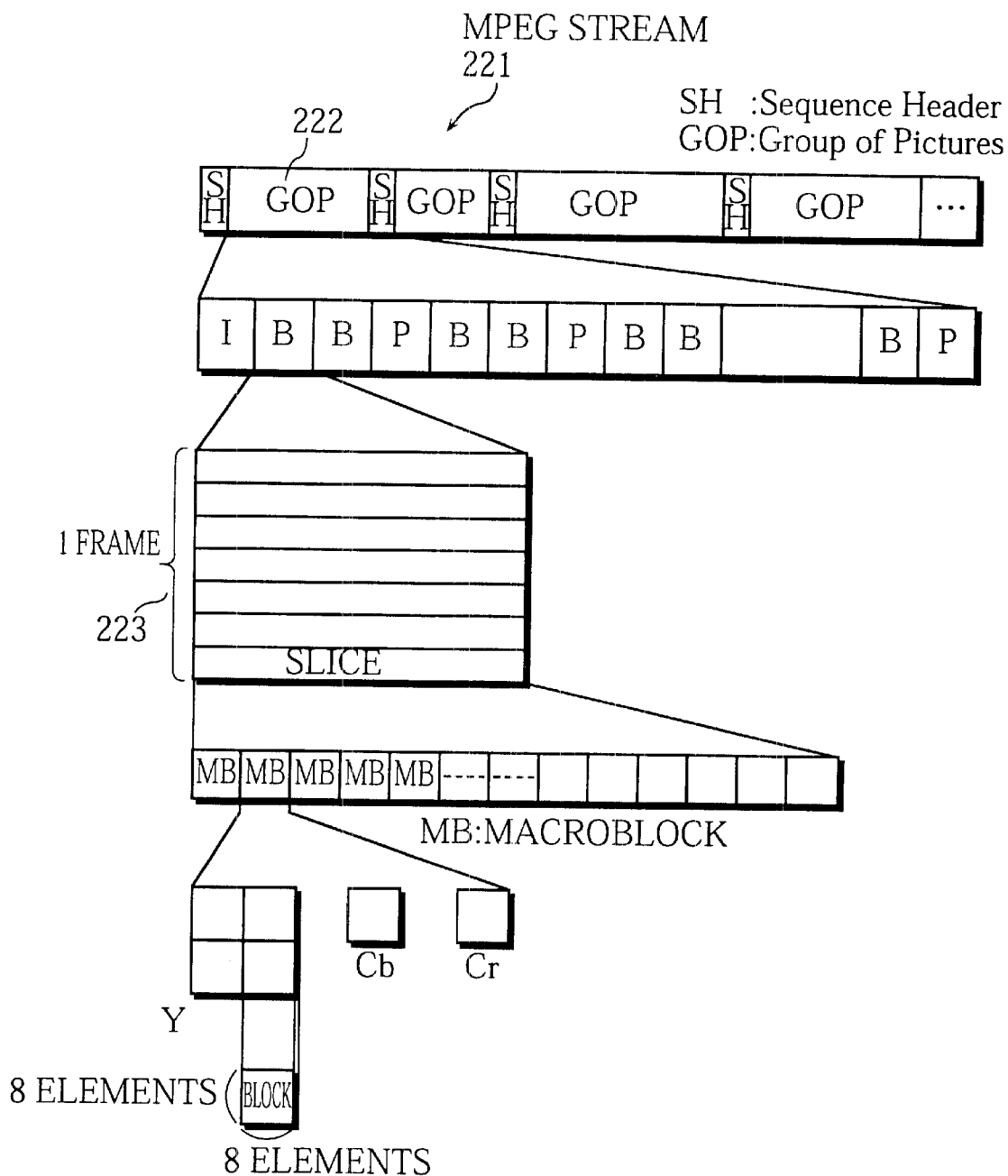
FIG. 4 shows the construction of data in an MPEG stream recorded in the data storage unit 102.

The data storage unit 102 stores an object table 201 and an MPEG stream 221, shown in FIGS. 3 and 4.

The object table 201 contains information relating to objects located in a 3D coordinate space A, and consists of data groups containing an object name 211, outline coordinates 212, location coordinates 213, and video display surface coordinates 214. Each group corresponds to one object.

The object name 211 identifies an object.

The outline coordinates 212 are a plurality of sets of 3D coordinate values in a 3D coordinate space B. Each of these sets shows one of the points forming an object. One of the points is located at the origin of the 3D coordinate space B.

The location coordinates 213 are one set of 3D coordinate values in the 3D space A. This coordinate set shows the location of the aforementioned point in the 3D space A. The video display surface coordinates 214 are a plurality of sets of 3D coordinate values in the 3D space B. These sets form part of the outline coordinates 212, and are selected so as to represent a surface with a limited area. The surface represented by the video display surface coordinates 214 is displayed with a video sequence pasted onto it. This surface is referred to as the video display surface (the video display area).

The MPEG stream 221 is a code sequence formed by compressing and encoding moving video according to the MPEG (Moving Picture Experts Group) standard. The MPEG stream 221 is constructed from a plurality of SH (sequence header) and GOP (group of pictures) pairs, as shown in FIG. 4. A GOP includes a plurality of pictures, each of which corresponds to a one-frame still image. A picture includes a plurality of slices, and each slice includes a plurality of macroblocks (MBs). Each macroblock is in turn made up of 4 luminance blocks Y, and two chrominance blocks Cb and Cr. A block is constructed from 8×8 elements, making 64 elements in total. Since this technology is well-known in the art, a more detailed explanation will be omitted.

Consecutive pictures are decoded in turn, giving an appearance of motion.

(3) Coordinate Light Source Calculating Unit 103

The coordinate light source calculating unit 103 is constructed from the processor 13, programs stored in the semiconductor memory 14, and the like.

The coordinate light source calculating unit 103 stores viewpoint coordinates E (Ex, Ey, Ez) located in the 3D coordinate space A, and also receives information showing forward, back, left, right, up, down and operation end from the input unit 101.

Upon receiving information showing a forward, back, left, right, up or down movement, the coordinate light source calculating unit 103 performs the following calculations for each of the viewpoint coordinates E according to the received information.

$Ey=Ey+1$ $Ey=Ey-1$ $Ex=Ex+1$ $Ex=Ex-1$ $Ez=Ez+1$ $Ez=Ez+1$

Furthermore, the coordinate light source calculating unit 103 reads the outline coordinates 212, the location coordinates 213 and the video display surface coordinates 214 for each object from the object table 201 stored in the data storage unit 102. The coordinate light source calculating unit 103 adds each value shown by the location coordinates 213 to each value shown by the outline coordinates 212, calculating 3D coordinates forming the object in the 3D coordinate space A.

Here, the coordinate light source calculating unit 103 calculates two-dimensional (2D) coordinates and depth values in relation to a plane H, located virtually in the 3D coordinate space A between the objects and the viewpoint coordinates E (Ex, Ey, Ez). The 2D coordinates represent each point of an object when it is projected onto the plane H seen from the viewpoint coordinates E, and the depth values represent the distance by which these points are separated from the plane H in the depth direction. Next, the coordinate light source calculating unit 103 performs clipping by using the 2D coordinates and depth values, thereby extracting the parts displayed in the window of the monitor 15. The coordinate light source calculating unit 103 then outputs to the rendering unit 104 2D coordinates on the plane H and depth values showing the distance from plane H in the depth direction for points belonging to each object that has been clipped. Clipping and the method used to calculate the 2D coordinates and the depth values are well-known in the art and so explanation of these processes is omitted here.

Similarly, the coordinate light source calculating unit 103 adds coordinate values shown by the location coordinates 213 to coordinate values shown by the video display surface coordinates 214, thereby calculating 3D coordinate values for points in the 3D coordinate space A forming a video display surface, and outputs the calculated 3D coordinates to the perspective transform unit 105.

(4) Rendering Unit 104

The rendering unit 104 is constructed from the processor 13, programs stored in the semiconductor memory 14, and the like.

The rendering unit 104 receives 2D coordinates and depth values for each object from the light source calculating unit 103, and performs rendering using the received 2D coordinates and depth values. This includes hidden line/surface deletion for deleting lines and surfaces that cannot be seen since they are hidden behind another object when the object is viewed from the viewpoint coordinates, displaying surface shading to make objects appear more realistic, displaying surface color, and texture mapping. The rendering unit 104 then forms a CG image from bitmap data and outputs it to the frame buffer 108. Here, the CG image is formed from a 640-pixel×480-pixel luminance signal image Y totaling 307 200 pixels, a 320-pixel×240-pixel chrominance signal image Cb totaling 76 800 pixels and a 320-pixel×240-pixel chrominance signal image Cr totaling 76 800 pixels. Each pixel has 8 bits.

Rendering processes such as hidden line/surface deletion, shading display, color display and texture mapping are well-known in the art, so further explanation will be omitted here.

(5) Perspective Transform Unit 105

The perspective transform unit 105 is constructed from the processor 13, programs stored in the semiconductor memory 14, and the like.

The perspective transform unit 105 receives 3D coordinates for points forming a video display surface in the 3D coordinate space A from the coordinate light source calculating unit 103. The perspective transform unit 105 then calculates 2D coordinates on the plane H for points forming the video display surface and outputs the calculated 2D coordinates to the image transform unit 107, in the same way as the coordinate light source calculating unit 103.

(6) Image Decoder 106

The image decoder 106 is constructed from the processor 13, programs stored in the semiconductor memory 14, and the like.

The image decoder 106 reads the MPEG stream 221 stored in the data storage unit 102, repeatedly generates video frames by decoding data from the read MPEG stream 221, and outputs the generated video frames to the image transform unit 107. The method used to generate video frames from an MPEG stream is well-known in the art, and so explanation will be omitted here.

The image decoder 106 decodes video frames at a rate of 30 frames per second.

(7) Image Transform Unit 107

The image transform unit 107 is constructed from the processor 13, programs stored in the semiconductor memory 14, and the like.

The image transform unit 107 receives a video frame from the image decoder 106 and 2D coordinates for points forming the video display surface from the perspective transform unit 105. Next, the image transform unit 107 changes the received video frame to the outline represented by the received 2D coordinates using an affine transform, and generates a transformed video frame. The image transform unit 107 outputs the transformed video frame to the frame buffer 108 by writing it over the area represented by the received 2D coordinates. Here, the transformed video frame is constructed from a plurality of pixels, each of which has eight bits.

(8) Frame Buffer 108

The frame buffer 108 is constructed from the semiconductor memory 14 or similar and stores still images.

(9) Display Unit 109

The display unit 109 is constructed from the monitor 15 or similar.

Figure 5:
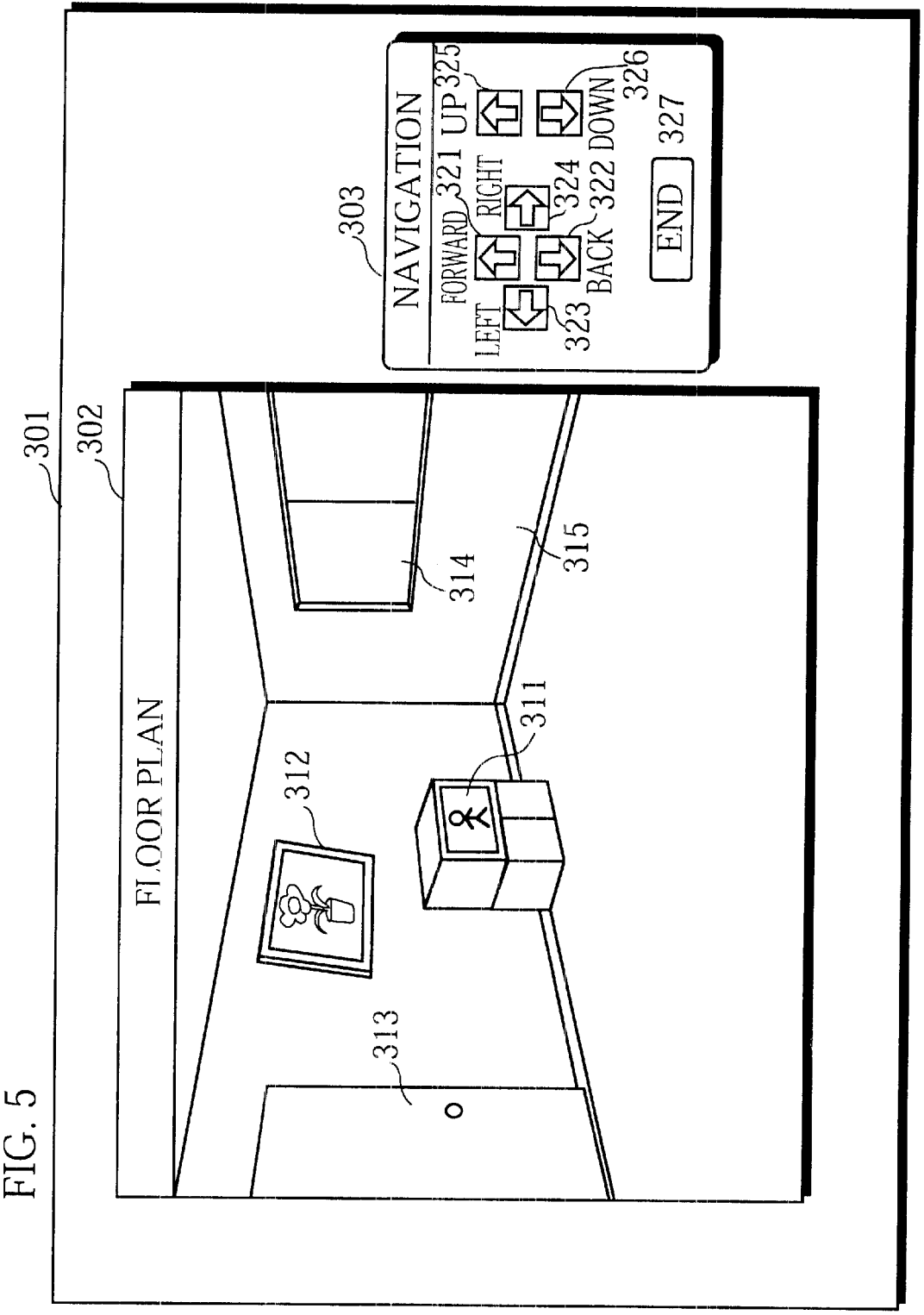
FIG. 5 shows an example screen displayed by a display unit 109.

The display unit 109 displays a screen 301, as shown in FIG. 5. The screen 301 includes a display window 302 and a navigation instruction menu 303.

Buttons 321 to 327 are displayed in the navigation instruction menu 303. These buttons 321 to 327 receive forward, back, left, right, up, down and operation end instructions respectively.

The display unit 109 displays a still image, stored in the frame buffer 108, in the display window 302.

1.2 Operation of the Moving Image Combining Apparatus 10

(1) Operation of the Moving Image Combining Apparatus 10

Figure 6:
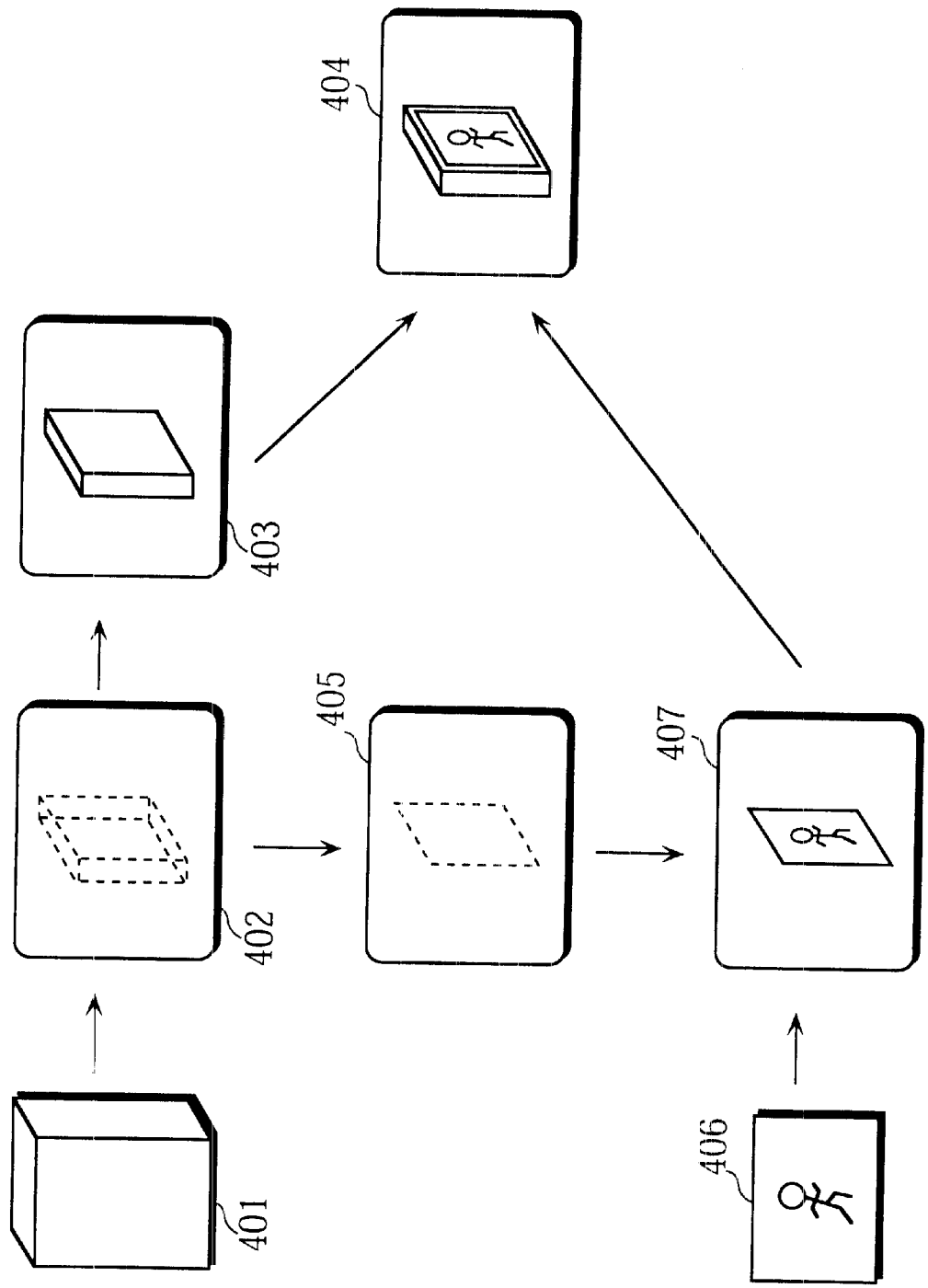
FIG. 6 shows data in each part of the processing performed by the moving image combining unit 10.
Figure 7:
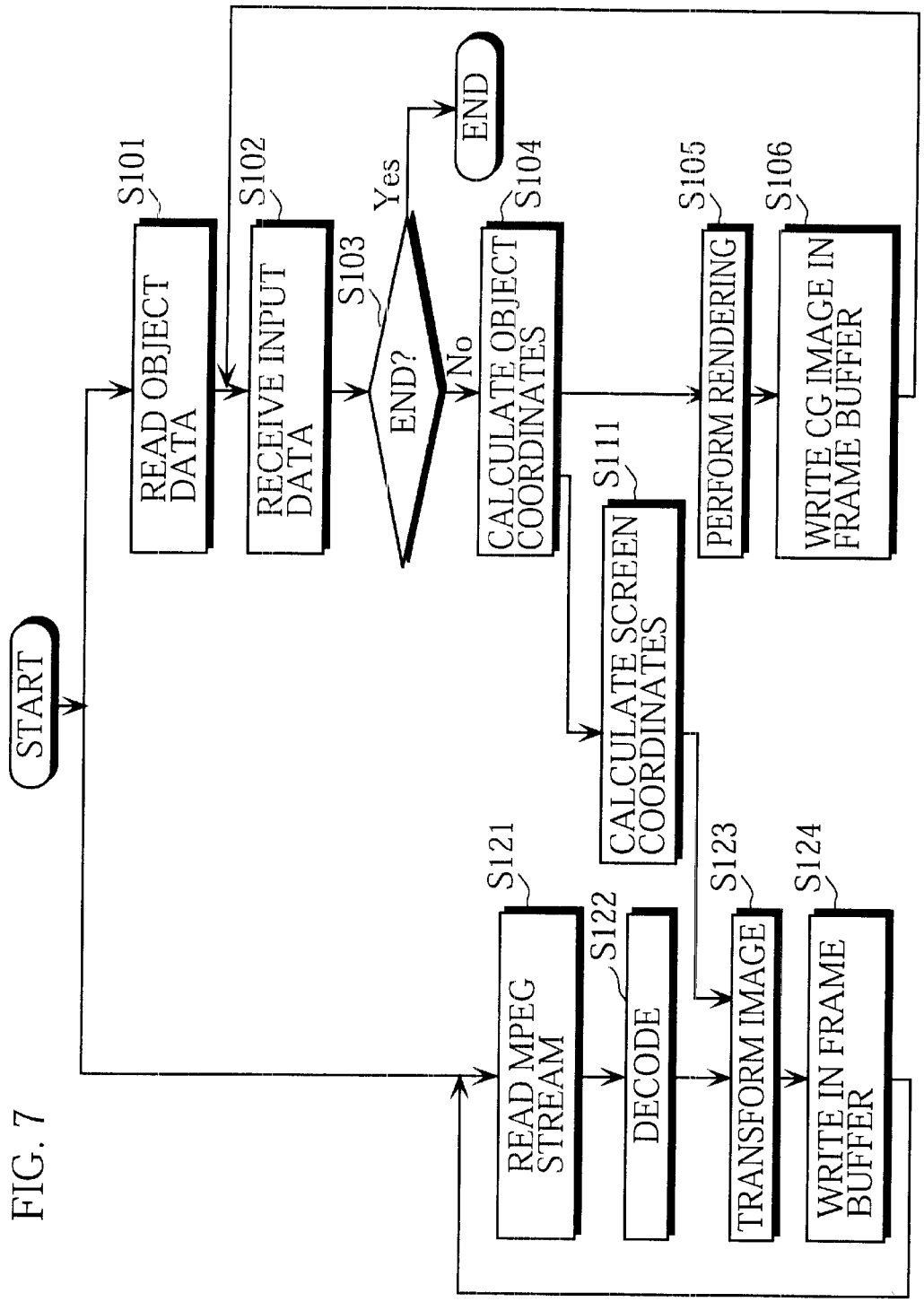
FIG. 7 is a flowchart showing the operation of the moving image combining unit 10.

The operation of the moving image combining apparatus 10 is explained with reference to FIGS. 6 and 7. FIG. 6 shows data in each process performed by the moving image combining apparatus 10, and FIG. 7 is a flowchart showing the operation of the moving image combining apparatus 10.

The coordinate light source calculating unit 103 reads outline coordinates 212, location coordinates 213 and video display surface coordinates 214 (object information 401) for each object from the object table 201 in the data storage unit 102 (step S101), and receives information showing a forward, back, left, right, up, down or operation end instruction from the input unit 101 (step S102). If information showing an operation end instruction is received, the coordinate light source calculating unit 103 ends the processing (step S103). If information showing another type of instruction is received (step S103), the light source coordinate calculating unit 103 calculates viewpoint coordinates E according to the received information, calculates 3D coordinates for points forming each object in the 3D coordinate space A, 2D coordinates for points on the plane H, and the depth values showing the distance of each point from the plane H in the depth direction (the latter two forming information 402), and performs clipping (step S104). The rendering unit 104 performs rendering such as deletion of hidden lines/surfaces, display of surface shading, display of surface color, and texture mapping by using the 2D coordinates and depth values, and forms a CG image (image 403) as a bitmap image (step S105). The rendering unit 104 then outputs the CG image to the frame buffer 108 (step S106). Next, the routine returns to step S102 and the above processing is repeated.

Following step S104, the coordinate light source calculating unit 103 also calculates 3D coordinates for points forming the video display surface in the 3D coordinate space A, and the perspective projection unit 105 calculates 2D coordinates (information 405) on the plane H for points forming a video display surface (step S111).

Meanwhile, the image decoder 106 reads the MPEG stream 221 stored in the data storage unit 102 (step S121), and generates a one-frame video frame by decoding data from the read MPEG stream 221 (step S122). The image transform unit 107 receives the video frame (image 406) from the image decoder 106 and receives 2D coordinates for points forming the video display surface, calculated in step S111, from the perspective transform unit 105. The image transform unit 107 then generates a transformed video frame (image 407) by using an affine transform to change the received video still image to the outline represented by the received 2D coordinates (step S123). The image transform unit 107 outputs the transformed video frame to the frame buffer 108 by writing it over the area shown by the received 2D coordinates (step S124). This enables the transformed video frame to be pasted onto the CG image (image 404). Next, the routine returns to step S121 and repeats the above processing.

(2) Timing of Processing Performed by Each Component of the Moving Image Combining Unit 10

Figure 8:
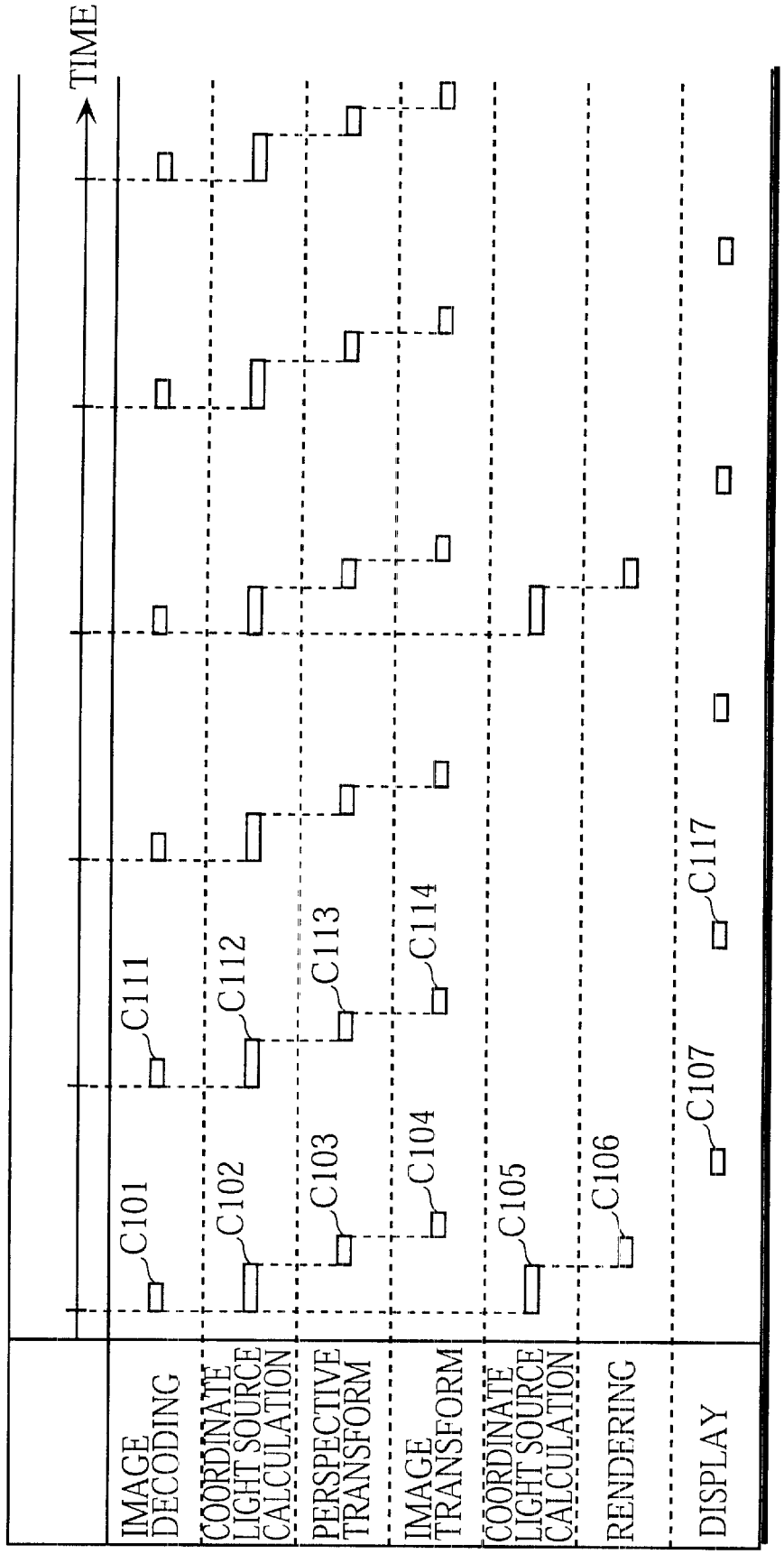
FIG. 8 is a timechart showing the timing of operations performed by the moving image combining unit 10.

FIG. 8 is a timechart showing the timing of processing performed by each component of the moving image combining unit 10. The horizontal axis shows time and the vertical axis shows the processing performed by the various components.

When a CG image and video frame are newly generated, and the video frame is pasted onto the CG image, image decoding C101, coordinate light source calculation C102 and coordinate light source calculation C105 are simultaneously started. Here, coordinate light source calculation C102 is performed by the coordinate light source calculating unit 103 to calculate 3D coordinates for points in the 3D coordinate space A showing the video display surface, and coordinate light source calculation C105 is performed by the coordinate light source calculating unit 103 to calculate 2D coordinates on the plane H for points forming an object, and depth values showing the distance of each of these points from the plane H in the depth direction. Once coordinate light source calculation C102 is completed, perspective transform C103 is performed, and once this is completed, image transform C104 is performed. Meanwhile, once coordinate light source calculation C105 is completed, rendering C106 is performed. When rendering C106 and image transform C104 have been completed, display C107 takes place.

When a new video frame is generated and pasted onto a previously-generated CG image, image decoding C111 and coordinate light source calculation C112 are simultaneously started. Here, coordinate light source calculation C112 is performed by the coordinate light source calculating unit 103 to calculate 3D coordinates in the 3D coordinate space A for points forming a video display surface. Once coordinate light source calculation C112 is completed, perspective transform C113 is performed, and once this is completed, image transform C114 is performed. When image transform C114 has been completed, display C117 takes place.

FIG. 8 shows a situation in which coordinate light source calculation C105 and rendering C106 are completed in a short time, in other words within the decode cycle period for a video frame (the period from the start of decoding for a video frame until the start of decoding for the next video frame, amounting to one thirtieth of a second in the present embodiment).

What Happens When Processing for Generating a CG Image is Lengthy

The following explains a situation in which a large number of objects are stored in the object table 201, and processing for generating the CG image (coordinate light source calculating and rendering) is not completed within the decoding cycle period for a video frame. Here, the input unit 101 may receive input at a high rate of for example, one hundred times per second.

Figure 29:
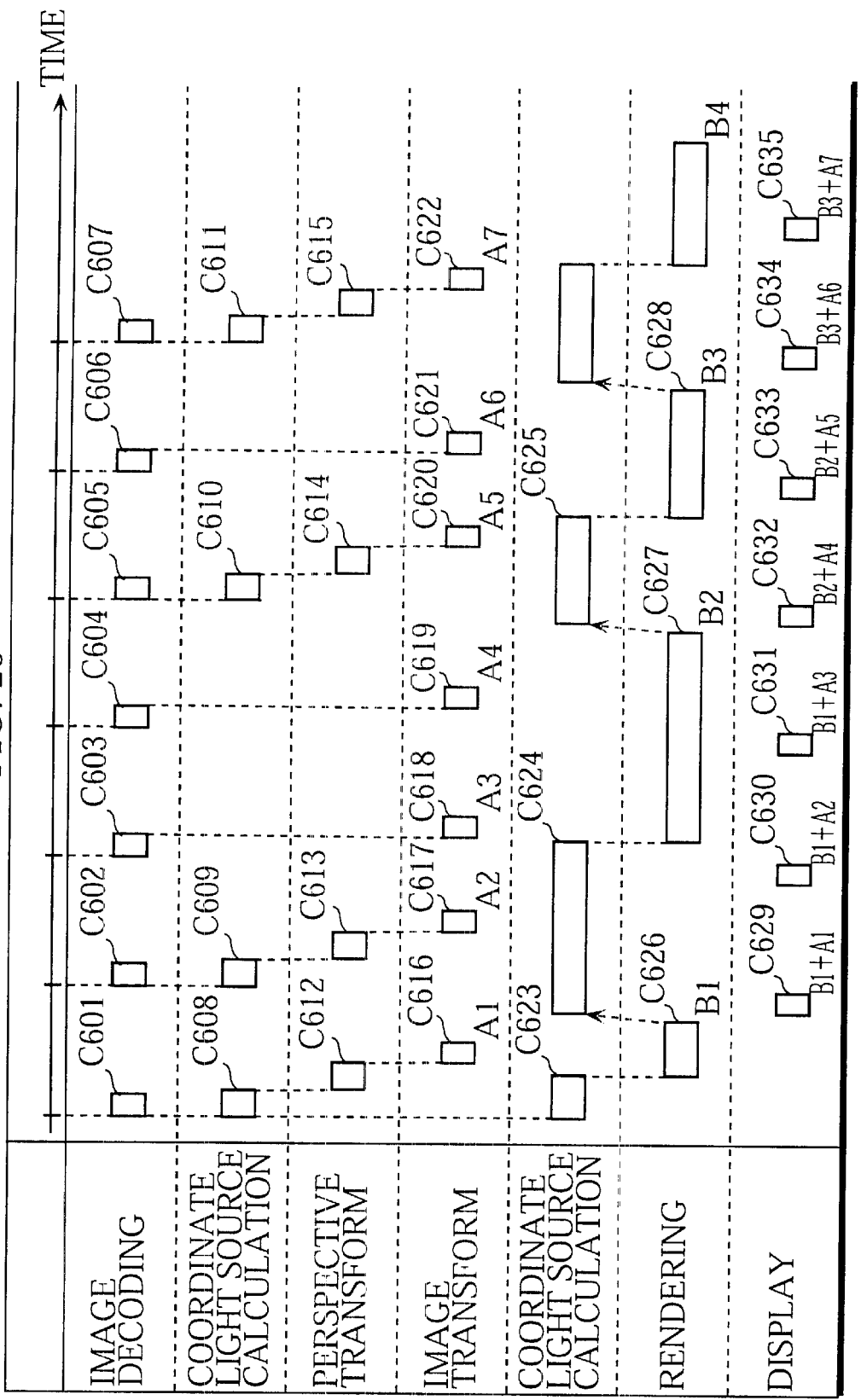
FIG. 29 is a timechart showing the timing of other operations performed by the moving image combining apparatus 10.

FIG. 29 is a timechart showing the timing of processing performed by various components of the moving image combining apparatus 10. As in FIG. 8, the horizontal axis shows time and the vertical axis shows processing performed by the various components of the moving image combining apparatus 10.

In the drawing, image decoding C601, coordinate light source calculation C608 and coordinate light source calculation C623 are simultaneously started. Here, coordinate light source calculation C608 is solely for calculation of points for the area on which the video frame is pasted, and coordinate light source calculation C623 is calculation for all of the objects. Thus, when there are a large number of objects, the processing time required for C623 is longer than that for C608. In addition, coordinate light source calculations C608, C609 and C610 are only performed when coordinate light source calculations C623, C624 and C625 respectively are performed. Accordingly, image transforms. C618 and C619 are performed using the result of perspective transform C613 and image transform C621 is performed using the result of perspective transform C614.

Next, when image transform C616 and rendering C626 have been completed, display C629 takes place. Suppose that a transformed video frame A1 is obtained as a result of image transform C616 and a CG image B1 is obtained as a result of rendering C626. In this case, a still image which is a composite of the transformed video frame A1 and the CG image B1 is displayed in display C629.

Next, image decoding C602 is started a fixed interval (for example one thirtieth of a second) after the start of image decoding C601. Coordinate light source calculation C609 is performed simultaneously with the start of image decoding C602, and then perspective transform C613 is performed followed by image transform C617. Suppose that a transformed video frame A2 is then obtained as a result of image transform C617. The subsequent display C630 takes place a fixed interval (for example one thirtieth of a second) after the start of display C629. Display C630 is started while the next coordinate light source calculation C624 is being processed, so the CG image B1 of display C629 is used as the displayed CG image. In other words, CG image B1 and transformed video frame A2 are combined and displayed in display C630.

Next, image decoding C603 is started a fixed interval after the start of image decoding C602. Once image decoding C603 is completed, image transform C618 is performed based on the result of perspective transform C613, and a transformed video frame A3 obtained. Next, since rendering C627 has still not been completed when display C631 takes place, the CG image B1 resulting from rendering C626 is used again, so that the CG image B1 and the transformed video frame A3 are combined and displayed in display C631.

In display C632, a CG image B2 obtained as a result of rendering C627 and a transformed video frame A4 resulting from image transform C619 are combined and displayed. Subsequent display takes place in a similar fashion.

As explained above, video images can be displayed at a fixed display rate, regardless of the time required to process graphics data.

Here, the coordinate light source calculations C608 to C610 are executed when coordinate light source calculations C623 to C625 start, but may instead be executed each time image decoding is implemented, as shown in FIG. 8. Alternatively, the calculations C608 to C610 may be executed at another time, such as when rendering starts.

Pipeline Processing for Coordinate Light Source Calculation and Rendering

Figure 30:
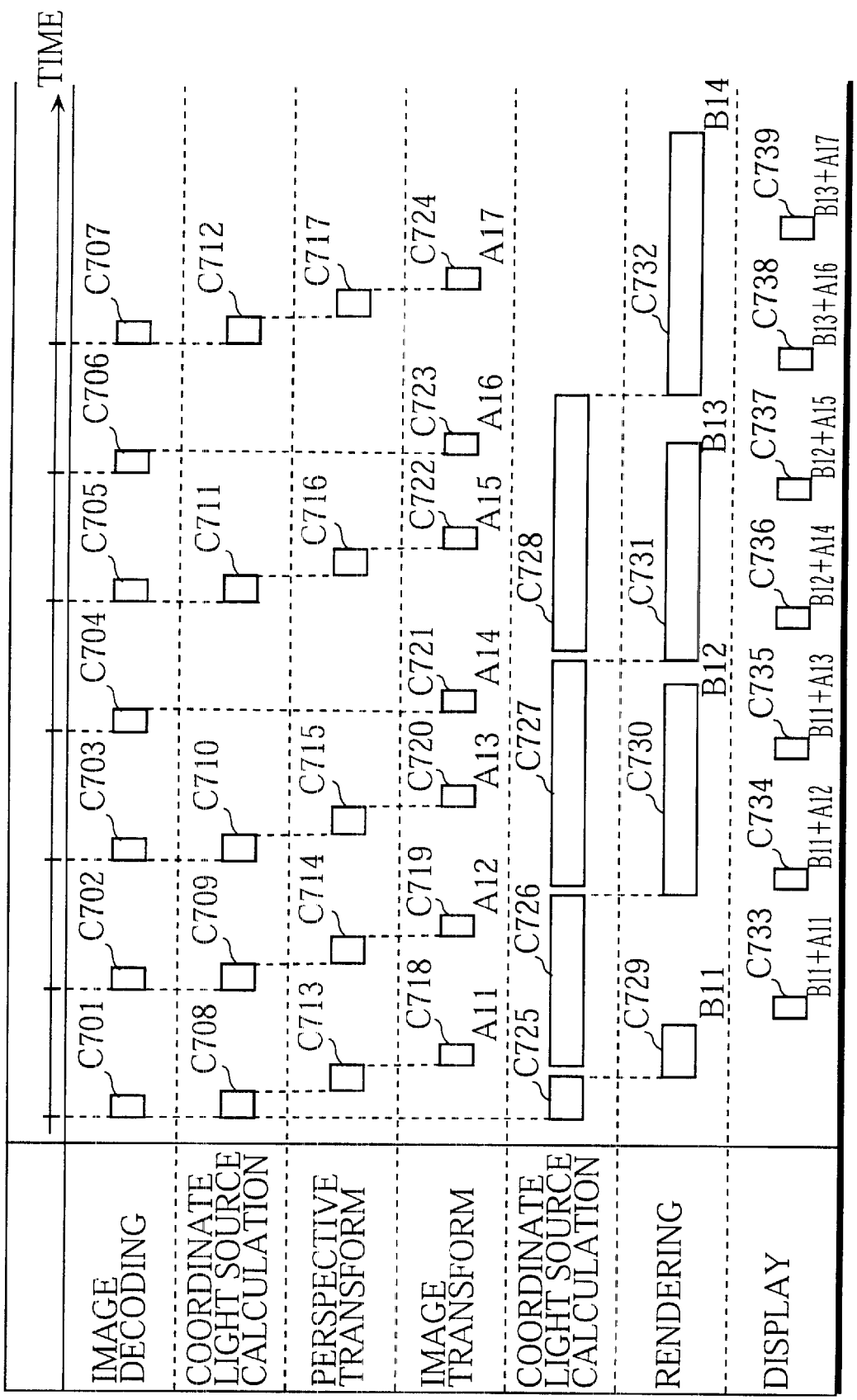
FIG. 30 is a timechart showing the timing of other operations performed by the moving image combining apparatus 10.

Coordinate light source calculation and rendering may also be performed using pipeline processing. The timing of processing performed by the various components of the moving image combining apparatus 10 in this case is shown by the flowchart in FIG. 30. In the drawing, as in FIG. 8, the horizontal axis shows time and the vertical axis shows processing performed by the various components of the moving image combining apparatus 10.

As shown in the drawing, image decoding C701, coordinate light source calculation C708 and coordinate light source calculation C725 are started simultaneously. Once coordinate light source calculation C725 has been completed, coordinate light source calculation C726 using viewpoint coordinates and rendering C729 using the result of coordinate light source calculation C725 are started simultaneously. Once rendering C729 is completed, display C733 takes place. Next, once coordinate light source calculation C726 is completed, coordinate light source calculation C727 using viewpoint coordinates, and rendering C730 using the result of coordinate light source calculation C726 are started simultaneously. Subsequent processing is performed in the same way.

As explained above, coordinate light source calculation and rendering are performed using pipeline processing, so that the time required for generating a CG image is shortened.

1.3 Summary

As was explained, generation of a CG image and decode/transform processing for a video frame are performed in parallel using separate processes, and the generated CG image and video frame are combined in the frame buffer 108. This means that computer graphics and video images can be combined at their respective display rates.

In other words, a CG image is generated ten times per second, and a video frame thirty times per second, and each can be combined in the frame buffer whenever it is generated.

Figure 9:
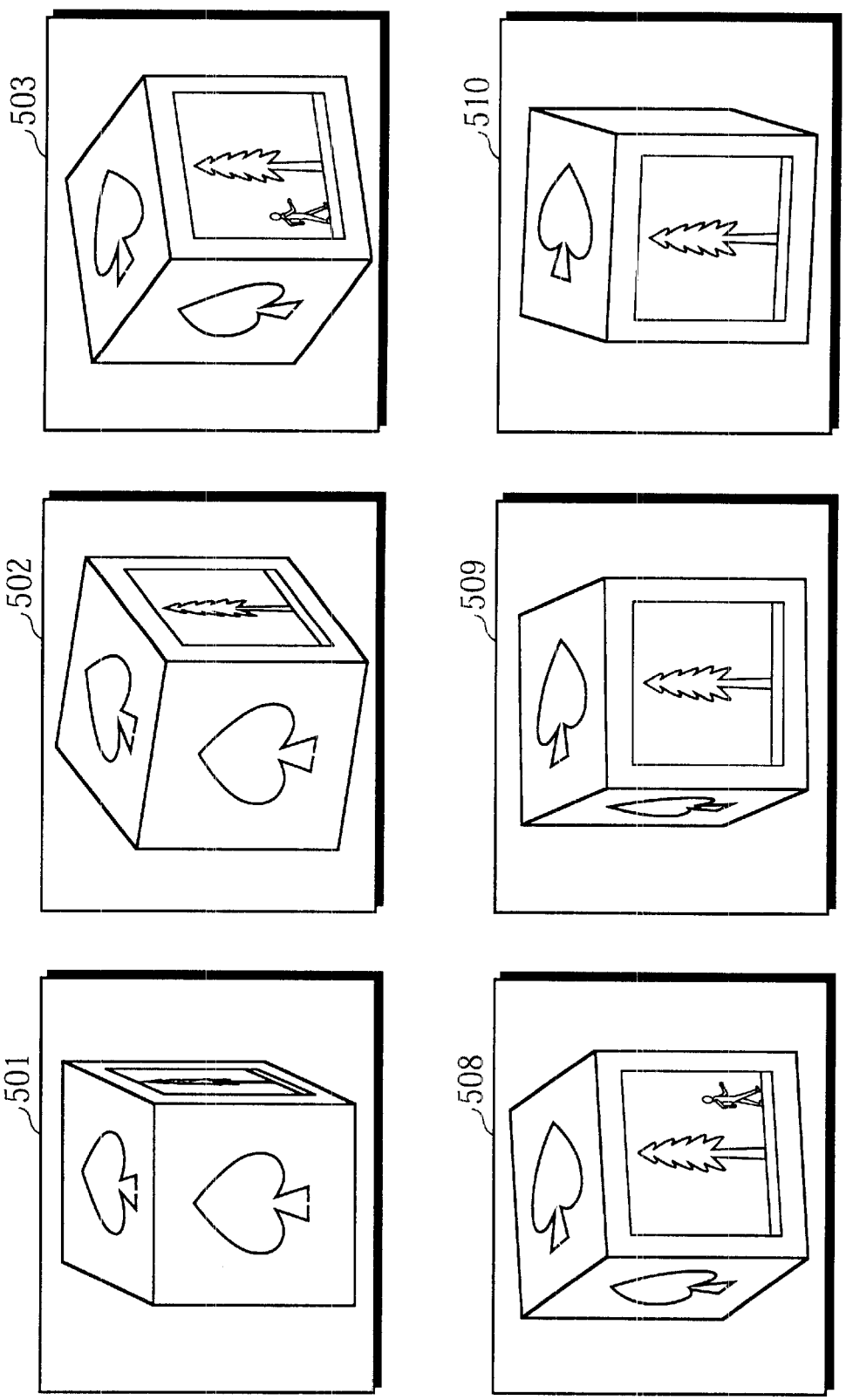
FIG. 9 shows the combining of a CG image and a video frame performed in the related art.

FIG. 9 shows the situation when CG images and video frames are combined in the related art. In the drawing, a cuboid graphic rotates in the order of images 501 to 503 and 508 to 510. A video sequence is pasted onto the video display surface of the cuboid. The display rate for the video sequence is fixed, so that, as shown in the drawing, several video frames are omitted from the video sequence when the image changes from 503 to 508. As a result, the video sequence does not move smoothly.

Figure 10:
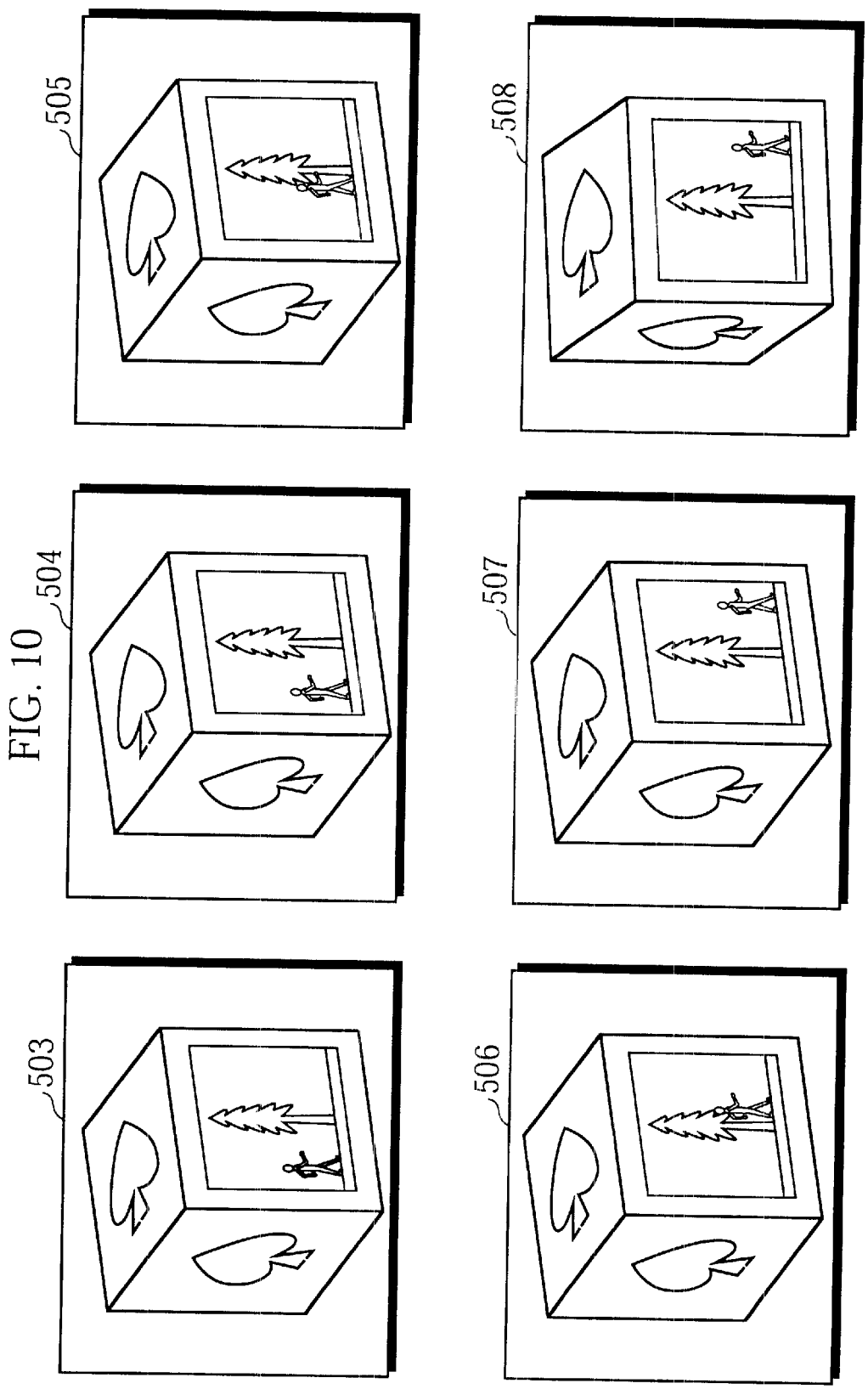
FIG. 10 shows the combining of a CG image and a video frame performed by the moving image combining unit 10.

FIG. 10 shows the situation when CG images and video frames are combined using the moving image combining apparatus 10. In the drawing, images 504 to 507, generated between the images 503 and 508 of FIG. 9, are displayed. As shown here, when the image changes from the image 503 to the image 508, video frames are pasted onto CG images without omitting several of the frames from the video sequence, so that the video sequence appears to move smoothly.

Here, the perspective transform performed by the perspective transform unit 105 is also performed by the rendering unit 104. Therefore, rather than providing the prospective transform unit 105, calculation results from perspective transforms performed by the rendering unit 104 may be,output to the image transform unit 107. Furthermore, adjustment of the depth direction, also known as perspective adjustment, may be performed by the image transform unit 107 by obtaining rotation information from the perspective transform unit 105.

Furthermore, the coordinate light source calculating unit 103, the rendering unit 104, the perspective transform unit 105, the image decoder 106, and the image transform unit 107 in the above embodiment are composed from the processor 13, programs stored in the semiconductor memory 14, and the like, but each of these components may alternatively be constructed from specialized hardware.

In the above embodiment, the moving video is an MPEG stream constructed according to the MPEG protocol, but a different data construction may be used.

2 Second Embodiment

The following is an explanation of a digital broadcast receiving apparatus 20 in an alternative to the first embodiment of the present invention.

2.1 Construction of Digital Broadcast Receiving Apparatus 20

As shown in FIG. 11, the digital broadcast receiving apparatus 20 includes a main unit 26, a monitor 21, a remote controller 22 and an antenna 23. The main unit 26 includes a tuner 110 for receiving broadcast waves, having various channels each carrying a video broadcast constructed from an MPEG stream, a CD-ROM drive in which a CD-ROM is loaded, a processor for executing programs, and a semiconductor memory storing programs and data. The digital broadcast receiving apparatus 20 reads object information related to 3D objects stored in the CD-ROM, receives a plurality of broadcast video images, and generates a CG graphic constructed from a plurality of objects. Each object has a video display surface, and a video frame is pasted onto the video display surface of each generated CG graphic, and the resulting image displayed on the monitor 21.

Figure 12:
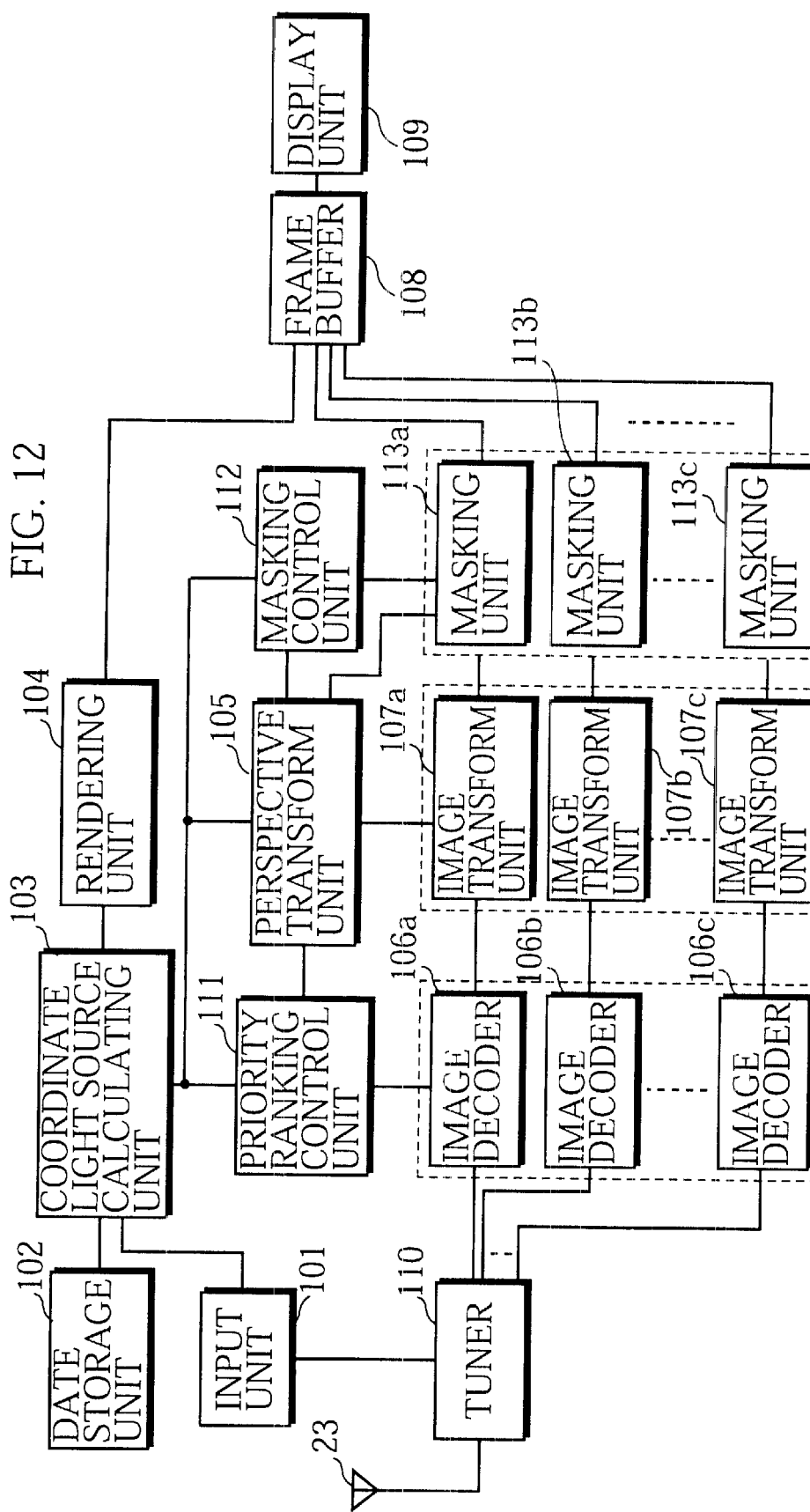
FIG. 12 is a block diagram showing a structure for the digital broadcast receiving apparatus 20.

A block diagram of the digital broadcast receiving apparatus 20 is shown in FIG. 12. As shown in the drawing, the digital broadcast receiving apparatus 20 is constructed from an input unit 101, a data storage unit 102, a coordinate light source calculating unit 103, a rendering unit 104, a perspective transform unit 105, image decoders 106a, 106b and 106c, image transform units 107a, 107b and 107c, a frame buffer 108, a display unit 109, a tuner 110, a priority ranking control unit 111, a masking control unit 112, masking units 113a, 113b and 113c and an antenna 23.

(1) Input Unit 101

The input unit 101 is constructed from the remote controller 22 or similar.

As shown in FIG. 11, numbered buttons, navigation instruction buttons 25, menu button 24 and the like are included on the upper face of the remote controller 22. When one of the buttons is operated by a user, information corresponding to the operated button is output to the tuner 110 and the coordinate light source calculating unit 103.

The user presses one of the numbered buttons to indicate a channel on which a video is to be received. Pressing the menu button 24 displays a program menu like the one in FIG. 13 on the monitor 21, while pressing the navigation instruction buttons 25 moves a virtual viewpoint within the program menu shown in the drawing, indicating movement forward, back, left, right, up and down.

(2) Data Storage Unit 102

The data storage unit 102 stores an object table 201 like the data storage unit 102 in the moving image combining unit 10.

The object table 201 is the same as the object table 201 stored in the data storage unit 102 in the moving image combining unit 10.

(3) Coordinate Light Source Calculating Unit 103

The coordinate light source calculating unit 103 is constructed from the processor 13, programs stored in the semiconductor memory 14, and the like, in the same way as the coordinate light source calculating unit 103 in the moving image combining unit 10.

The coordinate light source calculating unit 103 stores viewpoint coordinates E (Ex, Ey, Ez) in the 3D coordinate space A and also receives information showing forward, back, left, right, up, down and operation end instructions from the input unit 101.

Upon receiving information showing a forward, back, left, right, up or down movement, the coordinate light source calculating unit 103 performs the following calculations for each of the viewpoint coordinates E according to the received information.

$Ey=Ey+1$ $Ey=Ey-1$ $Ex=Ex+1$ $Ex=Ex-1$ $Ez=Ez+1$ $Ez=Ez-1$

Furthermore, the coordinate light source calculating unit 103 reads the outline coordinates 212, the location coordinates 213 and the video display surface coordinates 214 for each object from the object table 201 stored in the data storage unit 102. The coordinate light source calculating unit 103 adds each value shown by the location coordinates 213 to each value shown by the outline coordinates 212 and calculates 3D coordinates forming the objects in the 3D coordinate space A.

The coordinate light source calculating unit 103 calculates 2D coordinates and depth values in relation to a plane H located virtually in the 3D coordinate space between the objects and viewpoint coordinates E (Ex, Ey, Ez). The 2D coordinates represent each point of objects projected onto the plane H seen from the direction of the viewpoint coordinates E, and the depth values represent the distance by which each point is separated from the plane H in the depth direction. Next, the coordinate light source calculating unit 103 performs clipping by using the 2D coordinates and depth values, thereby extracting the parts displayed in the display window of the monitor 15. The coordinate light source calculating unit 103 then outputs to the rendering unit 104 2D coordinates on the plane H and depth values showing the distance from plane H in the depth direction for points belonging to each object which has been clipped. Clipping and the method used to calculate the 2D coordinates and the depth direction values are well-known in the art and so explanation of these processes is omitted here.

Similarly, the coordinate light source calculating unit 103 adds coordinate values shown by the location coordinates 213 to coordinate values shown by the outline coordinates 212, thereby calculating 3D coordinate values for points in the 3D coordinate space A forming each object, and outputs the calculated 3D coordinates to the perspective transform unit 105 and the priority ranking control unit 111.

(4) Rendering Unit 104

The rendering unit 104 is the same as the rendering unit 104 in the moving image combining apparatus 10, and so explanation is omitted here.

(5) Perspective Transform Unit 105

The perspective transform unit 105 is constructed from the processor 13, programs stored in the semiconductor 14, and the like, in the same way as the perspective transform unit 105 in the first embodiment.

The perspective transform unit 105 receives 3D coordinates for points forming each object in the 3D coordinate space A from the coordinate light source calculating unit 103, calculates 2D coordinates on the plane H for points forming the video display surface for each object in the same way as the coordinate light source calculating unit 103, and outputs the calculated 2D coordinates forming the video display surface of each object to the corresponding image transform unit 107a to 107c and the calculated 2D coordinates for all of the video display surfaces to the priority ranking control unit 111.

(6) Priority Ranking Control Unit 111

The priority ranking control unit 111 receives 3D coordinates for points forming each object in the 3D coordinate space A from the coordinate light source unit 103, and 2D coordinates for points on the plane H forming the video display surface for each object from the perspective transform unit 105.

The priority ranking control unit 111 determines a representative value for each object by selecting the largest Z coordinate value from the Z coordinate values of the points forming the video display surface. Next, the priority ranking control unit 111 ranks objects in order starting with the object having the smallest representative value. Thus the video display surface of each object is given a ranking.

Next, the priority ranking control unit 111 detects objects with overlapping video display surfaces, and determines which of the detected objects has the video display surface nearest the front of the 3D coordinate space, by referring to 3D coordinates for points forming the objects. Furthermore, the priority ranking control unit 111 leaves the priority ranking of the object whose moving image display is nearest the front unchanged, while lowering the priority ranking of the other objects with overlapping video display surfaces.

When objects are ranked in this way, objects nearer to plane H in the 3D coordinate space will have a higher ranking. The priority ranking for each image decoder is determined based on this ranking, and output to the image decoder 106a to 106c corresponding to each object.

(7) Antenna 23 and Tuner 110

The antenna 23 receives broadcast waves and outputs them to the tuner 110.

Upon receiving information corresponding to the menu button 24 from the input unit 101, the tuner 110 selects video sequences constructed from three MPEG streams broadcast on three channels from broadcast waves received by the antenna 23, and outputs each of the three selected video sequences to one of the image decoders 106a to 106c.

(8) Image Decoders 106a, 106b, 106c

The image decoder 106a is constructed from the processor 13, programs stored in the semiconductor memory 14, and the like, in the same way as the image decoder 106 in the moving image combining unit 10.

The image decoder 106a receives a priority ranking from the priority ranking control unit 111.

The image decoder 106a also receives a video sequence formed from one MPEG stream from the tuner 110. The image decoder 106a then repeatedly generates video frames by decoding data from the read MPEG stream, and outputs generated video frames to the image transform unit 107a, according to the received priority ranking.

If a highest priority ranking is received, the image decoder 106a decodes all of the video frames from the MPEG stream.

If a medium priority ranking is received, the image decoder 106a decodes every other video frame from the MPEG stream.

If a low priority ranking is received, the image decoder 106a decodes one in every four video frames from the MPEG stream. In other words, the image decoder 106a skips three out of every four video frames.

In this way, more video frames from the MPEG stream are skipped at a lower priority ranking, leaving a greater number of video frames undecoded.

The image decoders 106b and 106c are identical to the image decoder 106a.

(9) Image Transform Units 107a, 107b and 107c

The image transform unit 107a is constructed from the processor 13, programs stored in the semiconductor memory 14, and the like, in the same way as the image transform unit 1075 in the moving image combining apparatus 10.

The image transform unit 107a receives a video frame from the image decoder 106a and 2D coordinates for points forming the video display surface from the perspective transform unit 105. Next the image transform unit 107 changes the received video frame to the outline represented by the received 2D coordinates using an affine transform, thereby generating a transformed video frame. The transformed video frame is output to the masking unit 113a.

The image transform units 107b and 107c are identical to the image transform unit 107a.

(10) Masking Control Unit 112

The masking control unit 112 is constructed from the processor 13, programs stored in the semiconductor memory 14, and the like.

The masking control unit 112 receives 3D coordinates for points forming objects in the 3D coordinate space A from the coordinate light source calculating unit 103, and receives 2D coordinates on the plane H for points forming video display surfaces for each object from the perspective transform unit 105. The masking control unit 112 detects overlapping objects and calculates masked areas using the received 3D coordinates and 2D coordinates, a masked area being the area of each video display surface that cannot be seen as it is concealed behind another object. The masking control unit 112 then outputs the calculated masked area for each object to the masking unit 113a to 113c corresponding to the video display surface for each object.

(11) Masking Units 113a, 113b, 113c

The masking unit 113a is constructed from the processor 13, programs stored in the semiconductor memory 14, and the like.

The masking unit 113a receives 2D coordinates for points on plane H forming the video display surface for each object from the perspective transform unit 105.

Furthermore, the masking unit 113a receives a transformed video frame from the image transform unit 107a and a masked area from the masking control unit 112. The masking unit 113a then sets all of the pixel values in the area of the transformed video frame shown by the masked area at 0. Next, the masking control unit 112 outputs the transformed video image, in which all of the pixel values in the masked area have been set at 0, to the frame buffer 108 by writing it over the area shown by the received 2D coordinates.

The masking units 113b and 113c are identical to the masking unit 113a.

(12) Frame Buffer 108

The frame buffer 108 is identical to the frame buffer 108 in the moving image combining apparatus 10.

(13) Display Unit 109

Figure 13:
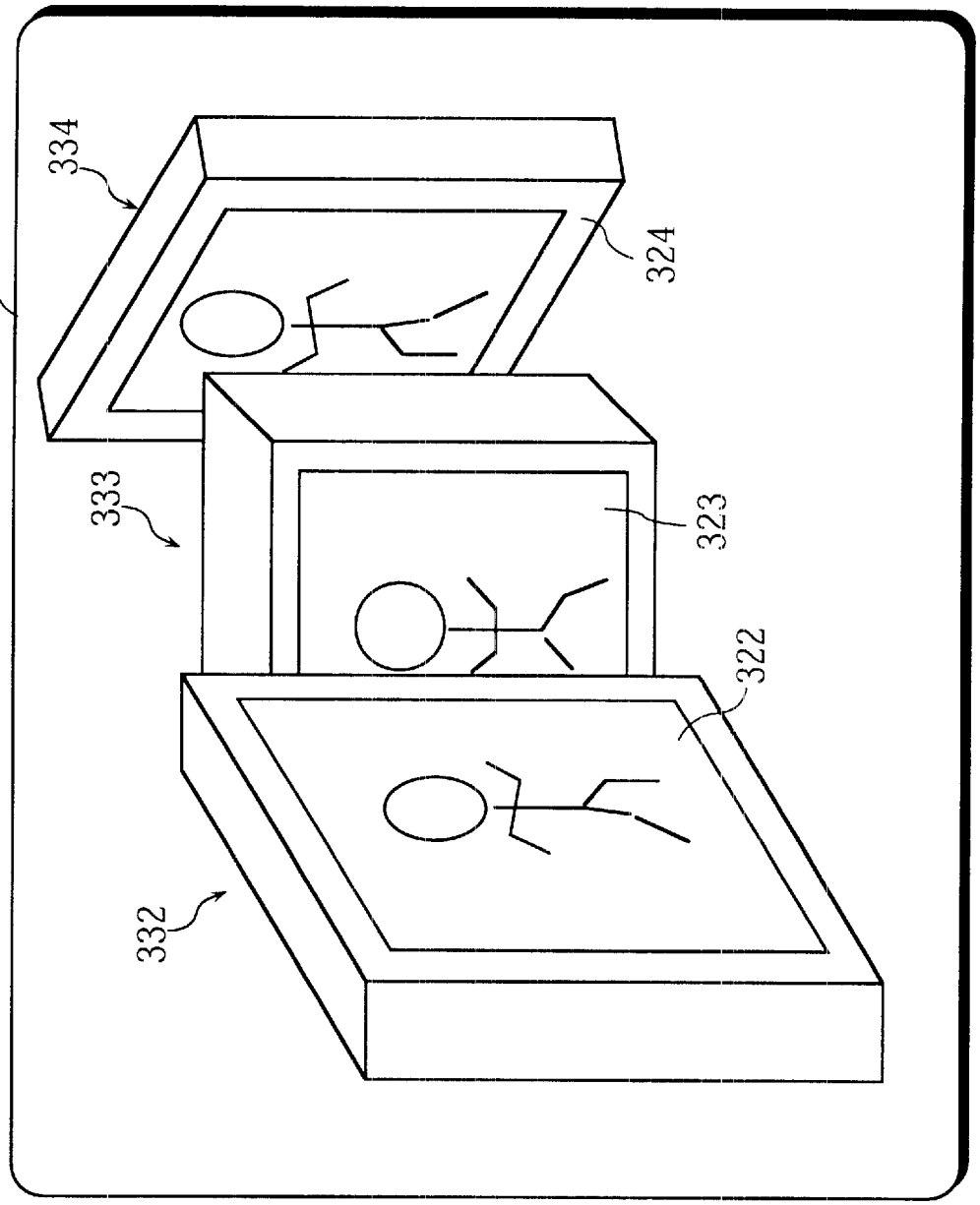
FIG. 13 is an example screen displayed by the display unit 109.

The display unit 109 displays a screen 321, as shown in FIG. 13. Objects 332, 333 and 334 are displayed in the screen 321, and each object has a video display surface, numbered 322, 323 and 324 respectively. A video sequence is displayed on each of the video display surfaces.

2.2 Operation of Digital Broadcast Receiving Apparatus 20

(1) Operation of Digital Broadcast Receiving Apparatus 20

Figure 14:
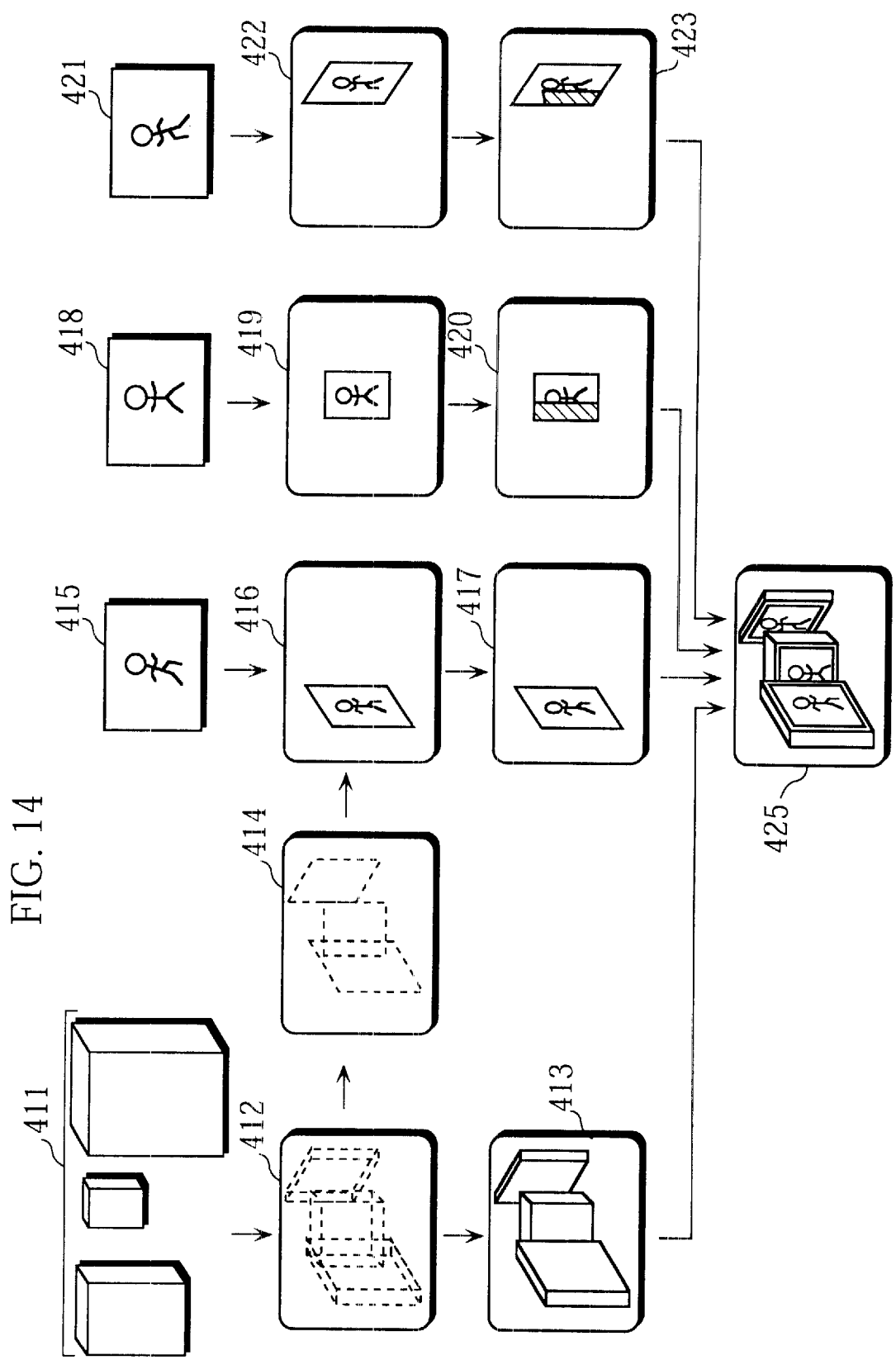
FIG. 14 shows data in each part of the processing performed by the digital broadcast receiving apparatus 20.

The operation of the digital broadcast receiving apparatus 20 is explained with reference to FIGS. 14 to 16. FIG. 14 shows data for each process performed by the digital broadcast receiving apparatus 20, FIG. 15 is a flowchart showing the operation of the digital broadcast receiving apparatus 20, and FIG. 16 is a flowchart showing the operation of the priority ranking control unit 111 in the digital broadcast receiving apparatus 20.

Figure 15:
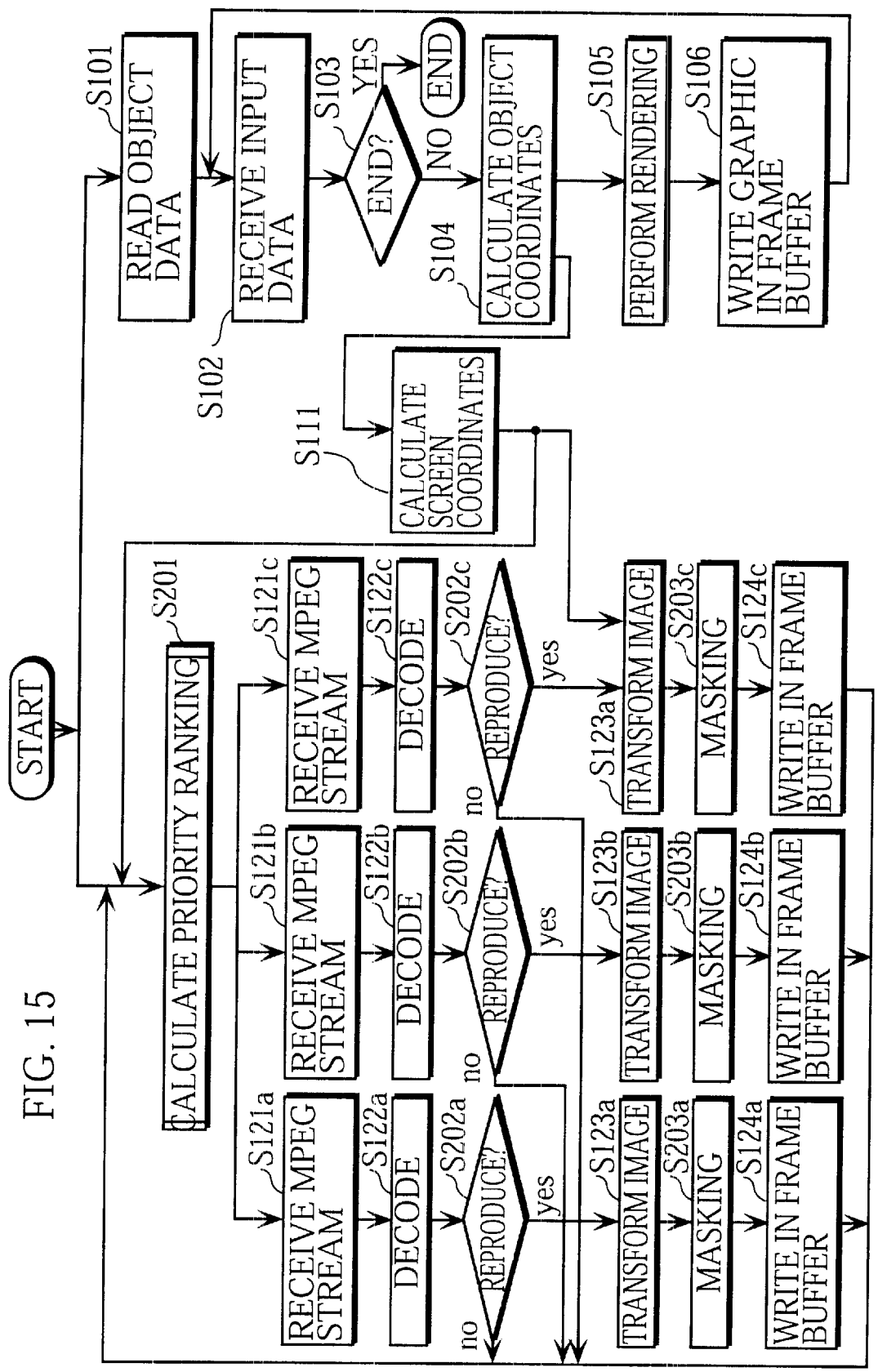
FIG. 15 is a flowchart showing the operation of the digital broadcast receiving apparatus 20.
Figure 16:
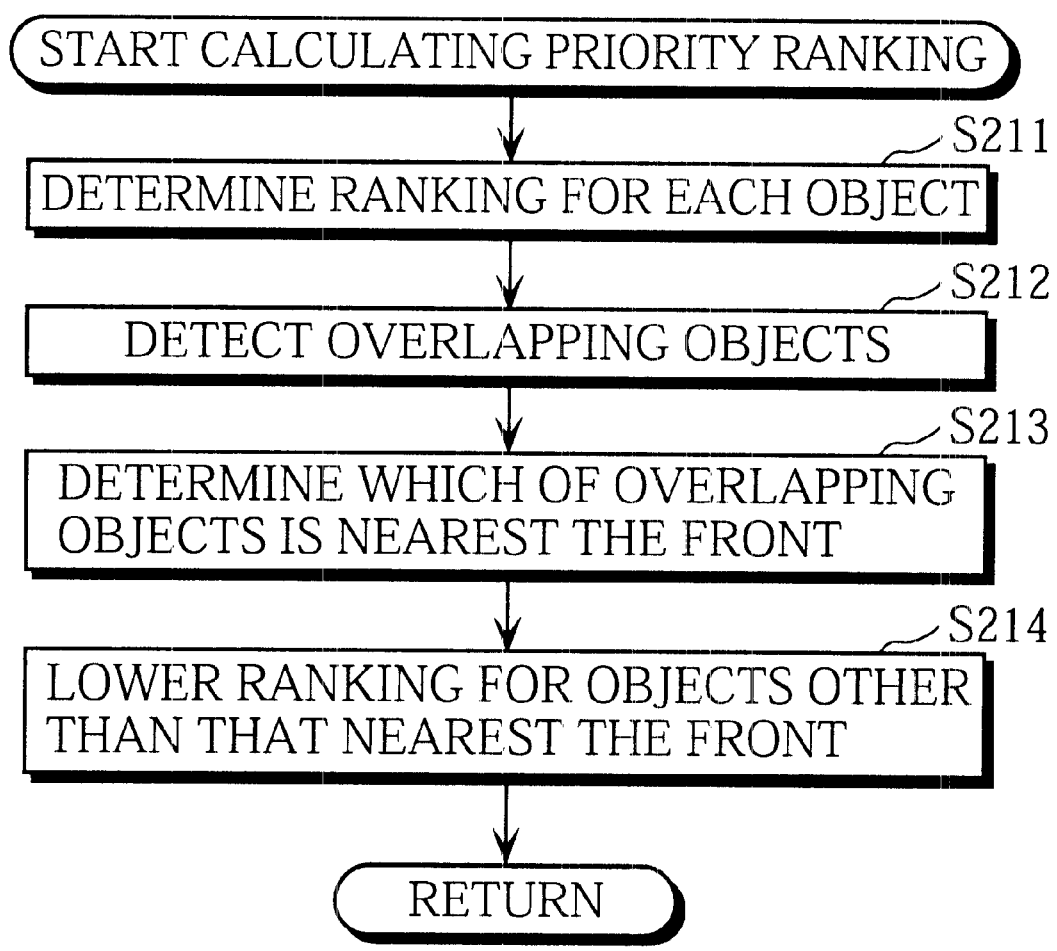
FIG. 16 is a flowchart showing the operation of priority ranking calculations performed by the digital broadcast receiving apparatus 20.

Steps in the flowchart shown in FIG. 15 having the same numerical references as steps in the flowchart of FIG. 7 have the same processing content. The following explanation concentrates on the differences from the flowchart of FIG. 7. 3D coordinates 412 for points forming objects in the 3D space A are calculated based on object information 411 stored in the data storage unit 102, and coordinates 414 forming video display surfaces are then calculated based on these 3D coordinates 412. A CG image 413 is formed based on the 3D coordinates 412.

Once calculation of the coordinates 414 forming the video display surfaces is completed in step S111, the priority ranking control unit 111 determines priority rankings for each image decoder, and outputs the determined priority rankings to the corresponding image decoders (step S201). Next, the image decoder 106a receives an MPEG stream (step S121a) and decodes the MPEG stream, generating a video frame 415 (step S122a). The image decoder 106a determines whether the video frame is to be reproduced by referring to the priority ranking (step S202a). If the video frame is not to be reproduced, processing returns to step S201. If the video frame is to be reproduced, the image transform unit 107a transforms it, generating a transformed video frame 416 (step S123a). The masking control unit 113a generates a transformed video frame 417 on which masking has been implemented (step S203a), and writes it in the frame buffer 108 (step S124a). Processing then returns to step S201.

In the same way, steps S121b to S122b, S202b, S123b, S203b and S124b generate a video frame 418, generate a transformed video frame 419 and generate a transformed video frame 420 on which masking has been implemented before writing it in the frame buffer 108. Also in a similar way, steps S121c to S122c, S202c, S123c, S203c and S124c generate a video frame 421, generate a transformed video frame 422 and generate a transformed video frame 423 on which masking has been implemented before writing it in the frame buffer 108.

In this way, a still image 425, where the three video frames have been pasted onto the video display surfaces of three objects in the CG image, is generated in the frame buffer 108.

The following is an explanation of the priority ranking determining operation performed in step S201 by the priority ranking control unit 111.

The priority ranking control unit 111 determines a representative value for each object as the largest Z coordinate value from the Z coordinate values for points forming the video display surface, and ranks the objects in order, starting with the object having the smallest representative value (step S211). Next, the priority ranking control unit 111 detects objects with overlapping video display surfaces using the 3D coordinates for points forming each object (step S212). The priority ranking control unit 111 then determines which of the objects with overlapping video display surfaces is nearest the front of the 3D coordinate space (step S213), and leaves the priority ranking of the video display surface nearest the front unchanged, while lowering the priority ranking of the other objects with overlapping video display surfaces (step S214).

(2) Timing of Processing Performed by Each Component of the Digital Broadcast Receiving Apparatus 20

Figure 17:
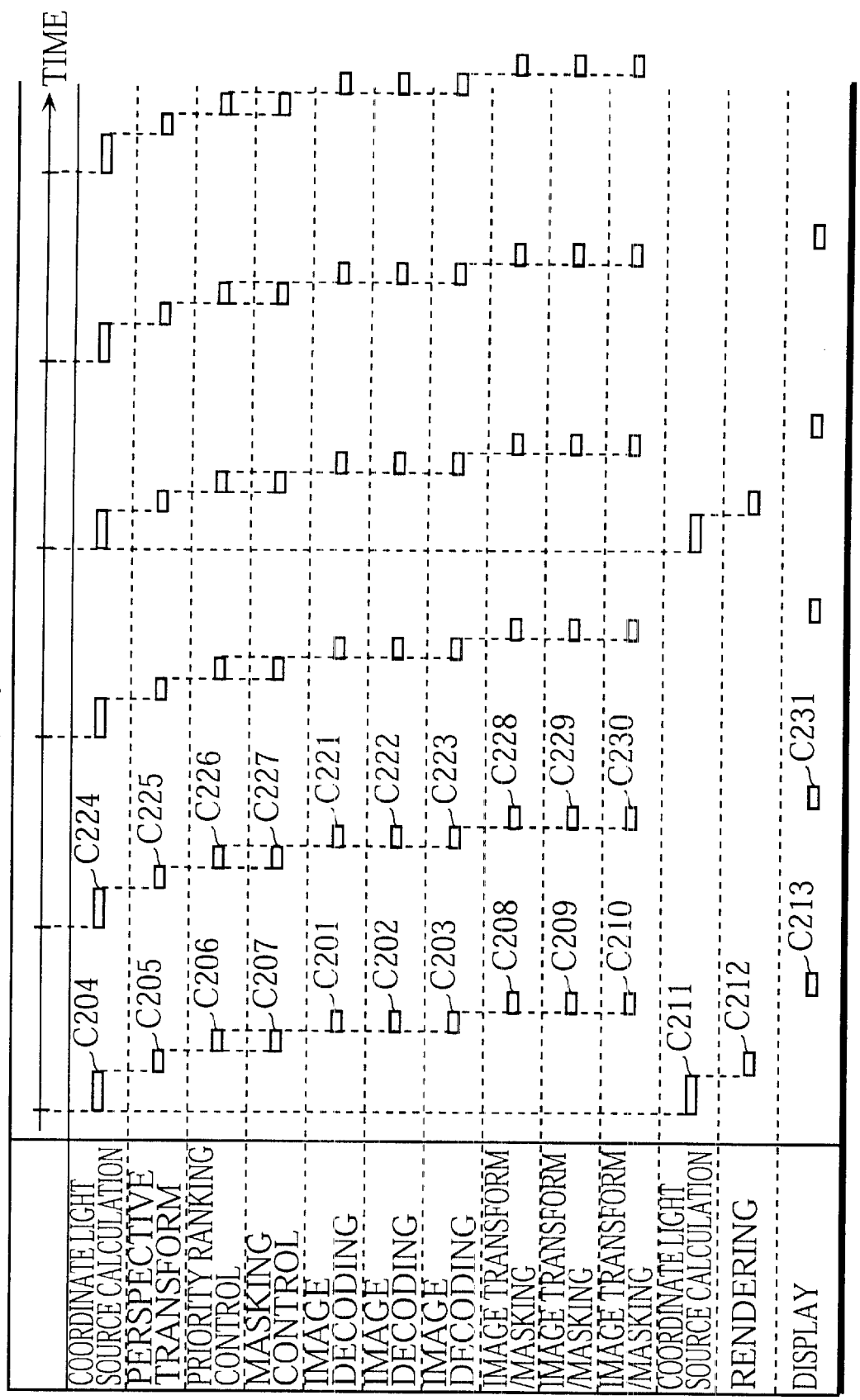
FIG. 17 is a timechart showing the timing of operations performed by the digital broadcast receiving apparatus 20.

FIG. 17 is a timechart showing processing timing for various components of the digital broadcast receiving apparatus 20. The horizontal axis shows time and the vertical axis shows processing performed by various components of the digital broadcast receiving apparatus 20.

When a CG image and video frames are newly generated, and the video frames are pasted onto the CG image, coordinate light source calculation C204 and coordinate light source calculation C211 are simultaneously started. Here, coordinate light source calculation C204 is performed by the coordinate light source calculating unit 103 to calculate 3D coordinates for points in the 3D coordinate space A showing video display surfaces, and coordinate light source calculation C211 is performed by the coordinate light source calculating unit 103 to calculate 2D coordinates on the plane H for points forming objects, and depth values showing the distance of each point from the plane H in the depth direction. Once the coordinate light source calculation C204 is completed, perspective transform C205 is performed, and once this is completed, priority ranking control C206 and masking control C207 are simultaneously started. In addition, once priority ranking control C206 is completed, image decoders 106a to 106c start image decoding C201, C202 and C203. When image decoding C201, C202 and C203 have been completed, image transform/masking C208, C209 and C210 are started. Meanwhile, once coordinate light source calculation C211 is completed, rendering C212 is performed. Once rendering C212 and image transform/masking C208, C209 and C210 are completed, display C213 takes place.

When new video frames are generated and pasted onto a previously-generated CG image, coordinate light source calculation C224 is started. Here, coordinate light source calculation C224 is performed by the coordinate light source calculating unit 103 to calculate 3D coordinates in the 3D coordinate space A for points forming video display surfaces. Once coordinate light source calculation C224 is completed, perspective transform C225 is performed, and once this is completed, priority ranking control C226 and masking control C227 are simultaneously started. When priority ranking control C226 is completed, the image decoders 106a to 106c start image decoding C221, C222 and C223, and once this is completed, image transform/masking C228, C229 and C230 are started. Once image transform/masking C228, C229 and C230 are completed, display C231 is performed.

2.3 Summary

As explained above, generation of a CG image and decode/transform processing for a plurality of video frames are performed in parallel using separate processes, and the generated CG image and plurality of video frames are combined in the frame buffer 108. This means that computer graphics and images from a plurality of video sequences can be combined at their respective display rates. Additionally, the video display surface nearest the front of the 3D coordinate space has a higher priority ranking, and the number of frames decoded by the corresponding image decoder in a fixed time is increased, so that image quality increases as the priority ranking is raised.

The priority ranking control unit 111 is described as giving the video display surface nearest the front of the 3D coordinate space the highest priority ranking, using z coordinate values as a reference, but alternatively the surface area of the video display surface may be used as a reference, so that the areas of the video display surfaces are calculated and video display surfaces with larger areas given a higher priority ranking.

The coordinate light source calculating unit 103, the rendering unit 104, the perspective transform unit 105, the image decoders 106a to 106c, the image transform units 107a to 107c, the priority ranking control unit 111, the masking control unit 112, and the masking units 113a to 113c in this embodiment are constructed from a processor, programs stored in a semiconductor memory, and the like, but they may each be constructed from specialist hardware.

Alternatively, the image decoder 106a to 106c having a high priority ranking may be constructed from specialist hardware, and image decoders with a low priority ranking from the processor, and programs stored in the semiconductor memory. This enables decoding of video sequences with a high priority ranking to be performed quickly.

3 Third Embodiment

The following is an explanation of a moving image combining apparatus 30 in a further alternative to the first embodiment of the present embodiment.

3.1. Construction of Moving Image Combining Apparatus 30

The moving image combining apparatus 30, like the moving image combining apparatus 10, is constructed from a main unit 11, a CD-ROM drive 12 in which a CD-ROM is loaded, a processor 13 executing programs, a semiconductor memory 14 storing programs and data, a monitor 15, a keyboard 16, speakers 17 and a mouse 18. The moving image combining apparatus 30 reads object information for a three-dimensional object and video frames recorded on the CD-ROM, generates a CG image, pastes a video frame onto the CG image and displays the combined image on the monitor 15.

Figure 18:
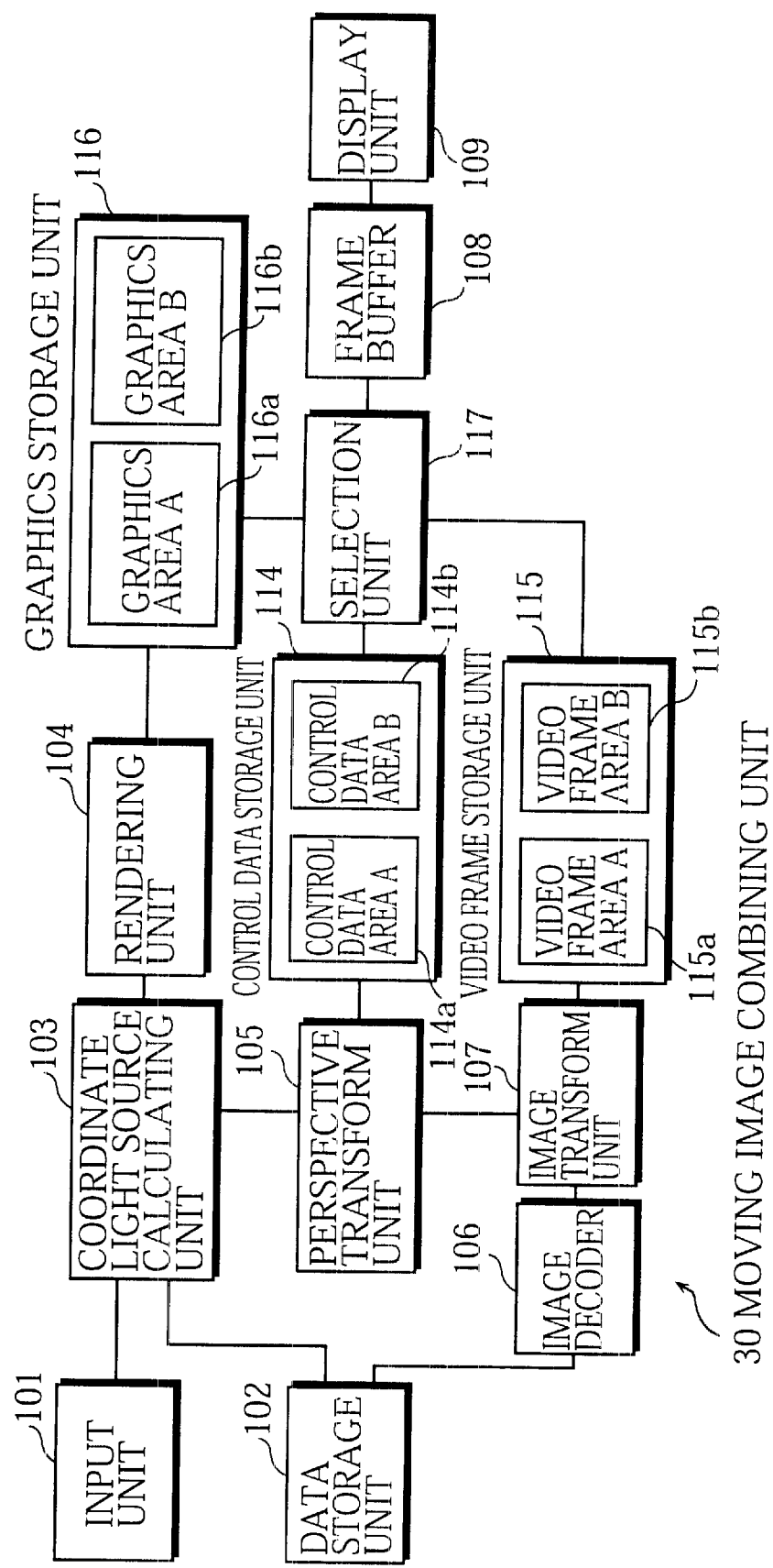
FIG. 18 is a block diagram showing a structure for a moving image combining apparatus 30 in a further alternative to the first embodiment of the present invention.

FIG. 18 is a block diagram of the moving image combining apparatus 30. In the drawing, the moving image combining apparatus 30 is constructed from an input unit 101, a data storage unit 102, a coordinate light source calculating unit 103, a rendering unit 104, a perspective transform unit 105, an image decoder 106, an image transform unit 107, a frame buffer 108, a display unit 109, a control data storage unit 114, a video frame storage unit 115, a graphics storage unit 116 and a selection unit 117.

The components of the moving image combining apparatus 30 having the same numerical reference as components of the moving image combining apparatus 10 have the same construction, so the following explanation concentrates on the differences from the components of the moving image combining apparatus 10.

(1) Graphics Storage Unit 116

The graphics storage unit 116 has a graphics area A116a and a graphics area B116b, each storing a CG image.

(2) Rendering Unit 104

Rather than outputting generated CG images to the frame buffer 108, the rendering unit 104 outputs them alternately to the graphics areas A116a and B116b.

(3) Control Data Storage Unit 114

The control data storage unit 114 has a control data area A114a and a control data area B114b, each storing control data.

(4) Perspective Transform Unit 105

The perspective transform unit 105 further generates control data, and outputs the generated control data alternately to control data areas A114a and B114b, as explained below.

Figure 19:
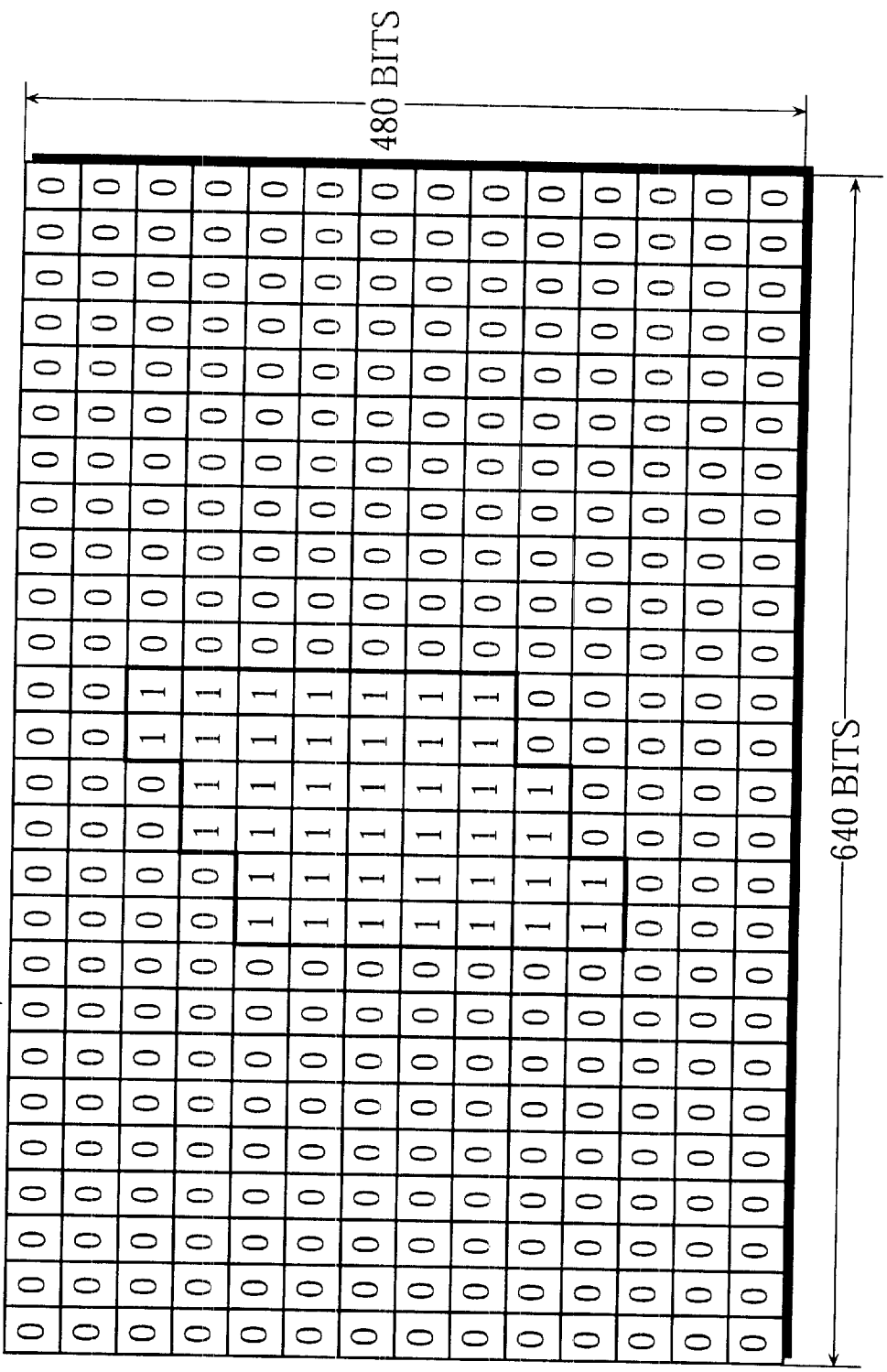
FIG. 19 is an example of control data stored in a control data storage unit in the moving image combining apparatus 30.

One example of the control data is control data 601 shown in FIG. 19. The control data 601 is a 640×480-bit data sequence, totaling 307 200 bits. Each bit has a value of either 1 or 0 and corresponds to a pixel in the CG image generated by the rendering unit 104.

The perspective transform unit 105 sets the value of bits in the control data 601 corresponding to the video display surface at 1, and the values of all other bits at 0.

(5) Video Frame Storage Unit 115

The video frame storage unit 115 has a video frame area A115a and a video frame storage area B115b, each storing a video frame.

(6) Image Transform Unit 107

Rather than outputting generated transformed video frames to the frame buffer 108 by writing them over the area shown by the received 2D coordinates, the image transform unit 107 outputs the transformed images alternately to the video frame area A115a and the video frame area B115b.

(7) Selection Unit 117

The selection unit 117 reads CG images alternately from the graphics area A116a and the graphics area B116b, video frames alternately from the video frame area A115a and the video frame area B115b and control data alternately from the control data area A114a and the control data area B114b.

The selection unit 117 determines whether each bit of the read control data is 1 or 0. If a bit is 0, the selection unit 117 reads a pixel at a location corresponding to the bit from the pixels forming the read CG image, and writes the read pixel at a corresponding location in the frame buffer 108. If a bit is 1, the selection unit 117 reads a pixel at a location corresponding to the bit from the pixels forming the read video frame and writes the read pixel at a corresponding location in the frame buffer 108.

3.2 Operation of the Moving Image Combining Apparatus 30

The following is an explanation of the moving image combining apparatus 30, with reference to FIGS. 20 to 24.

(1) Shape of the Data in Each Processing Performed by the Moving Image Combining Apparatus 30

Figure 20:
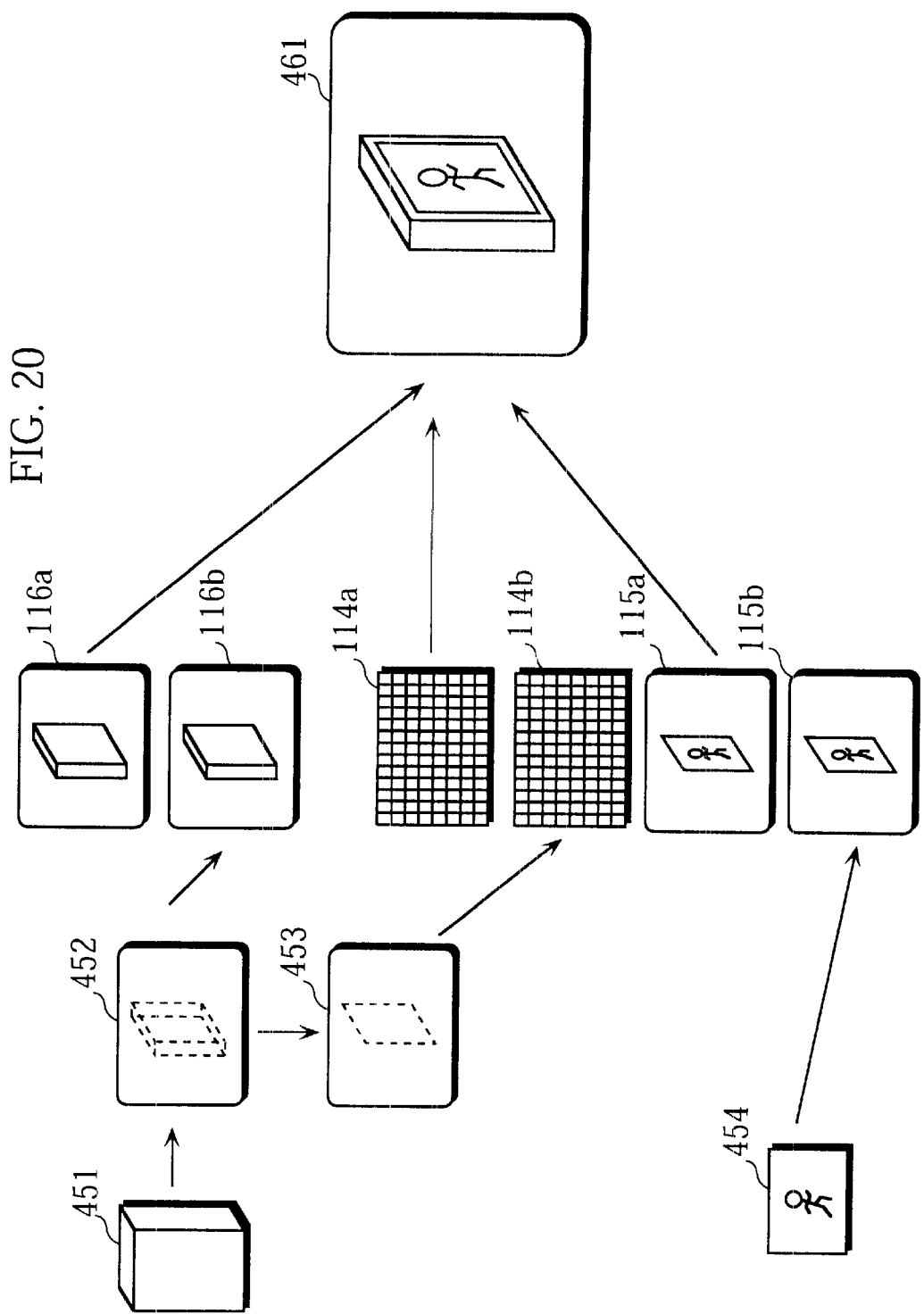
FIG. 20 shows data in each part of the processing performed by the moving image combining apparatus 30.

FIG. 20 shows data in each processing performed by the moving image combining apparatus 30.

As shown in the drawing, the coordinate light source calculating unit 103 calculates 3D coordinates 452 for points forming an object in the 3D coordinate space A using object information 451. The rendering unit 104 performs rendering, generating a CG image formed of bitmap data, and outputs the generated CG image to the graphics area B116b. The perspective transform unit 105 calculates 2D coordinates 453 on the plane H for points forming a video display surface, and generates control data before outputting it to the control data area B114b. The image transform unit 107 transforms a video frame 454 into a transformed video frame and outputs the transformed video frame to the video frame area B115b.

Meanwhile, the selection unit 117 reads a CG image from the graphics area A116a, a video frame from the video frame area A115a, and control data from the control data area A114a. The selection unit 117 combines the CG image and the video frame using the read control data and writes the combined image in the frame buffer 108.

At other times, the rendering unit 104 outputs a generated CG image to the graphics area A116a, the perspective transform unit 105 outputs control data to the control data area A114a and the image transform unit 107 outputs a transformed video frame to the video frame area A115a. Meanwhile, the selection unit 117 reads a CG image from the graphics area B116b, a video frame from the video frame area B115b, and control data from the control data area B114b. The selection unit 117 combines the CG image and the video frame us the read control data, and writes the combined image in the frame buffer 108.

In this way, the outputting of data to the graphics area A116a, the control data area A114a, and the video frame area A115a and the reading of data from the graphics area B116b, the control data area B114b and the video frame area B115b alternate with the outputting of data to the graphics area B116b, the control data area B114b, and the video frame area B115b, and the reading of data from the graphics area A116a, the control data area A114a, and the video frame area A115a.

(2) Relationship Between CG Images, Video Frames and Control Data

Figure 21:
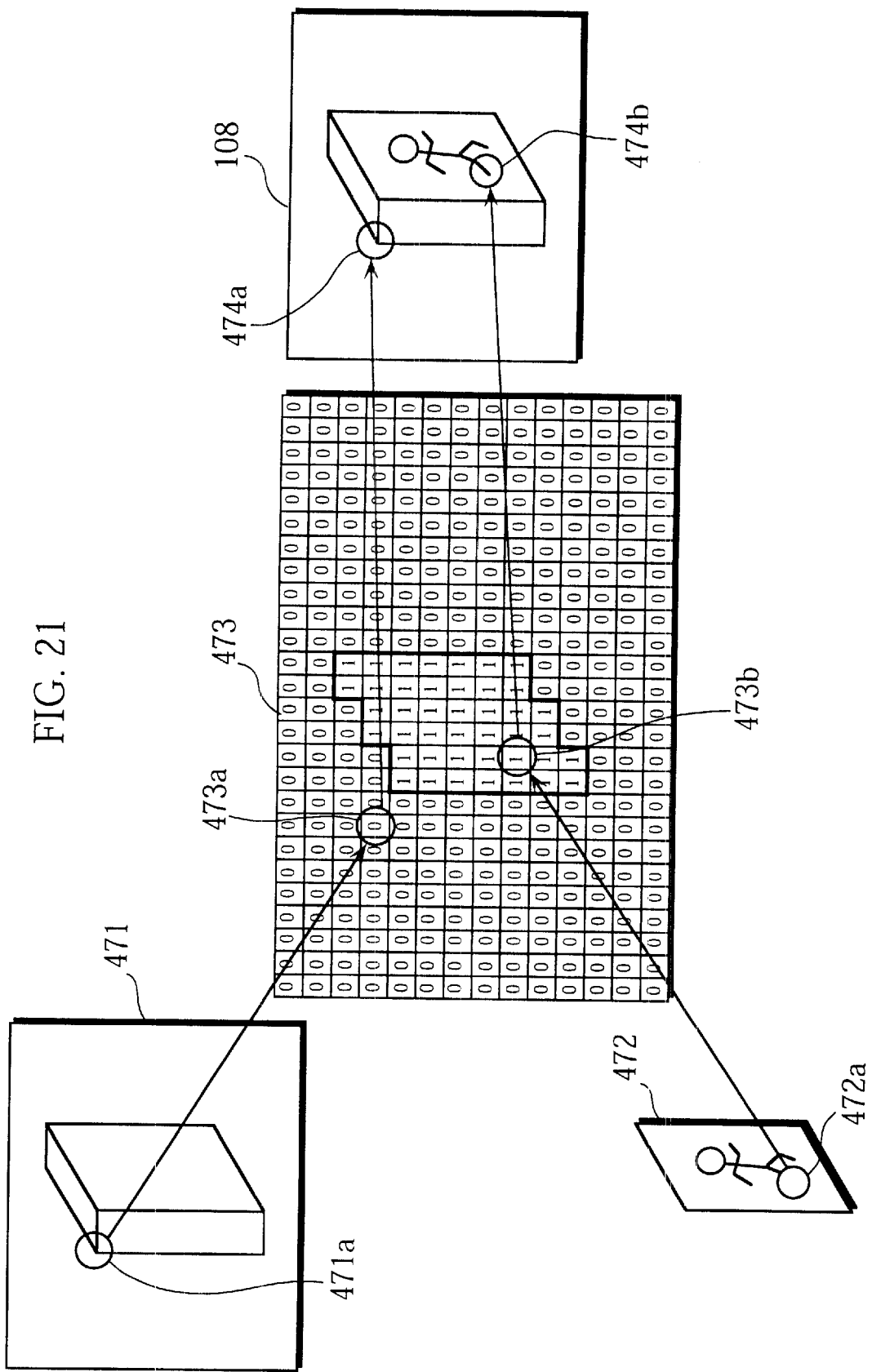
FIG. 21 shows the relation between CG images, video frames and control data in the moving image combining apparatus 30.

FIG. 21 shows the relationship between CG images, video frames and control data in the moving image combining apparatus 30.

In the drawing, a bit 473a in control data 473 is set at 0. The bit 473a corresponds to a part 471a of a CG image 471 that is not a video display surface. The part 471a is written in the frame buffer 108.

A bit 473b in control data 473 is set at 1. The bit 473b corresponds to a part 472a in a video frame 472. The part 472a is written in the frame buffer 108.

(3) Operation of Moving Image Combining Apparatus 30

Figure 22:
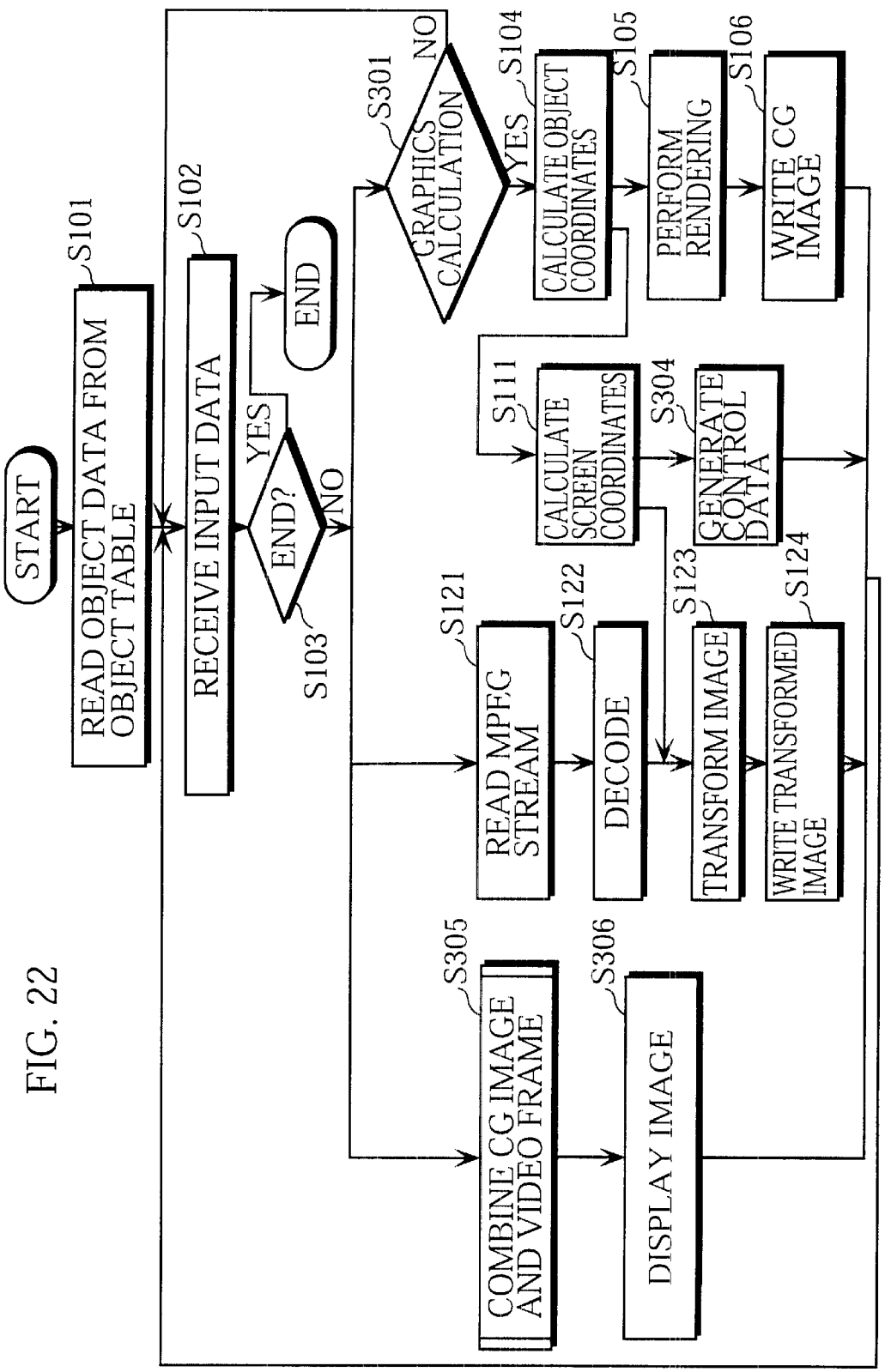
FIG. 22 is a flowchart showing the operation of the moving image combining apparatus 30.

FIG. 22 is a flowchart showing the operation of the moving image combining apparatus 30.

The coordinate light source calculating unit 103 reads outline coordinates 212, location coordinates 213 and video display surface coordinates 214 for each object from the object table 201 in the data storage unit 102 (step S101), and receives information showing a forward, back, left, right, up, down or operation end instruction from the input unit 101 (step S102). If information for an operation end instruction is received, the coordinate light source calculating unit 103 ends processing (step S103). If information for another type of instruction is received (step S103) and graphics calculation can take place at this time (step S301), the coordinate light source calculating unit 103 calculates viewpoint coordinates E according to the received information, 3D coordinates for points forming an object in the 3D coordinate space A, 2D coordinates for points formed on the plane H, and the depth values showing the distance of each point from the plane H in the depth direction, and clips the object (step S104). The rendering unit 104 performs rendering such as deletion of hidden lines and surfaces, display of surface shading, display of surface color, and texture mapping using the 2D coordinates and depth values, forming a CG image as a bitmap image (step S105). The rendering unit 104 then outputs the CG image to the CG image area A116a or the CG image area B116b (step S106). Next, the routine returns to step S102 and the above processing is repeated.

Following step S104, the coordinate light source calculating unit 103 also calculates 3D coordinates for points forming a video display surface in the 3D coordinate space A, and the perspective projection unit 105 calculates 2D coordinates on the plane H for points forming the video display surface (step S111). Control then moves to step S123. The perspective projection unit 105 generates control data (step S304). The routine then returns to step S102 and the above processing is repeated.

If graphics calculation cannot take place at this time (step S301), the routine returns once more to step S102, and processing is repeated.

Meanwhile, the image decoder 106 reads the MPEG stream 221 stored in the data storage unit 102 (step S121), and. repeatedly generates video frames by decoding data from the read MPEG stream 221 (step S122). The image transform unit 107 receives a video frame from the image decoder 106 and receives the 2D coordinates for points forming the video display surface calculated in step S111 from the perspective transform unit 105. The image transform unit 107 then generates a transformed video frame by using an affine transform to change the received video frame to the outline represented by the received 2D coordinates (step S123). The image transform unit 107 outputs the transformed video frame to the video frame area A115a or the video frame area B115b (step S124). Next, the routine returns to step S102 and the above processing is repeated.

In addition, the selection unit 117 reads a CG image from either the graphics area A116a or the graphics area B116b, a video frame from either the video frame area A115a or the video frame area B115b, and control data from either the control data area A114a or the control data area B114b. The selection unit 117 then combines the CG image and the video frame using the read control data, and writes the combined still image in the frame buffer 108 (step S305). The display unit 109 reads the still image from the frame buffer 108 and displays it (step S306). The routine then returns to step S102 and the above processing is repeated.

Figure 23:
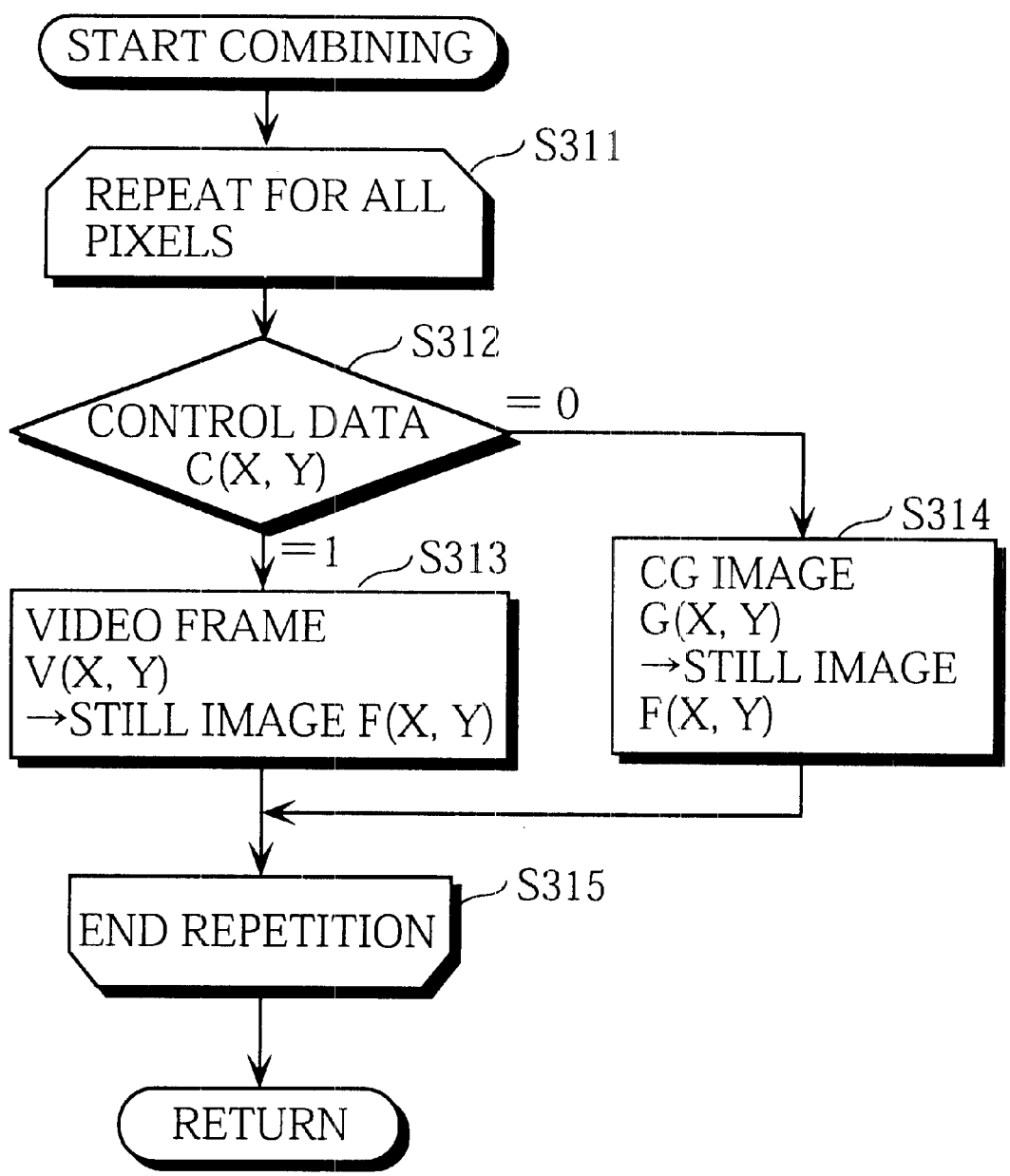
FIG. 23 is a flowchart showing the operation of combining performed by the moving image combining apparatus 30.

FIG. 23 is a flowchart showing the operation for image combining performed by the moving image combining apparatus 30.

The selection unit 117 repeats steps S312 to S314 explained below for each pixel of the still image written in the frame buffer 108.

When a bit C (x, y) in the control data is 1 (step S312), the selection unit 117 sets a pixel F (x, y) in the still image stored in the frame buffer 108 as a pixel V (x, y) from the video frame (step S313). When the bit C in the control data is 0 (step S312), the selection unit 117 sets the pixel F (x, y) in the still image stored in the frame buffer 108 as a pixel G (x, y) from the CG image (step S314). Here, (x, y) are coordinates showing a location in the still image.

(4) Timing of Processing Performed by Various Components of Moving Image Combining Apparatus 30

Figure 24:
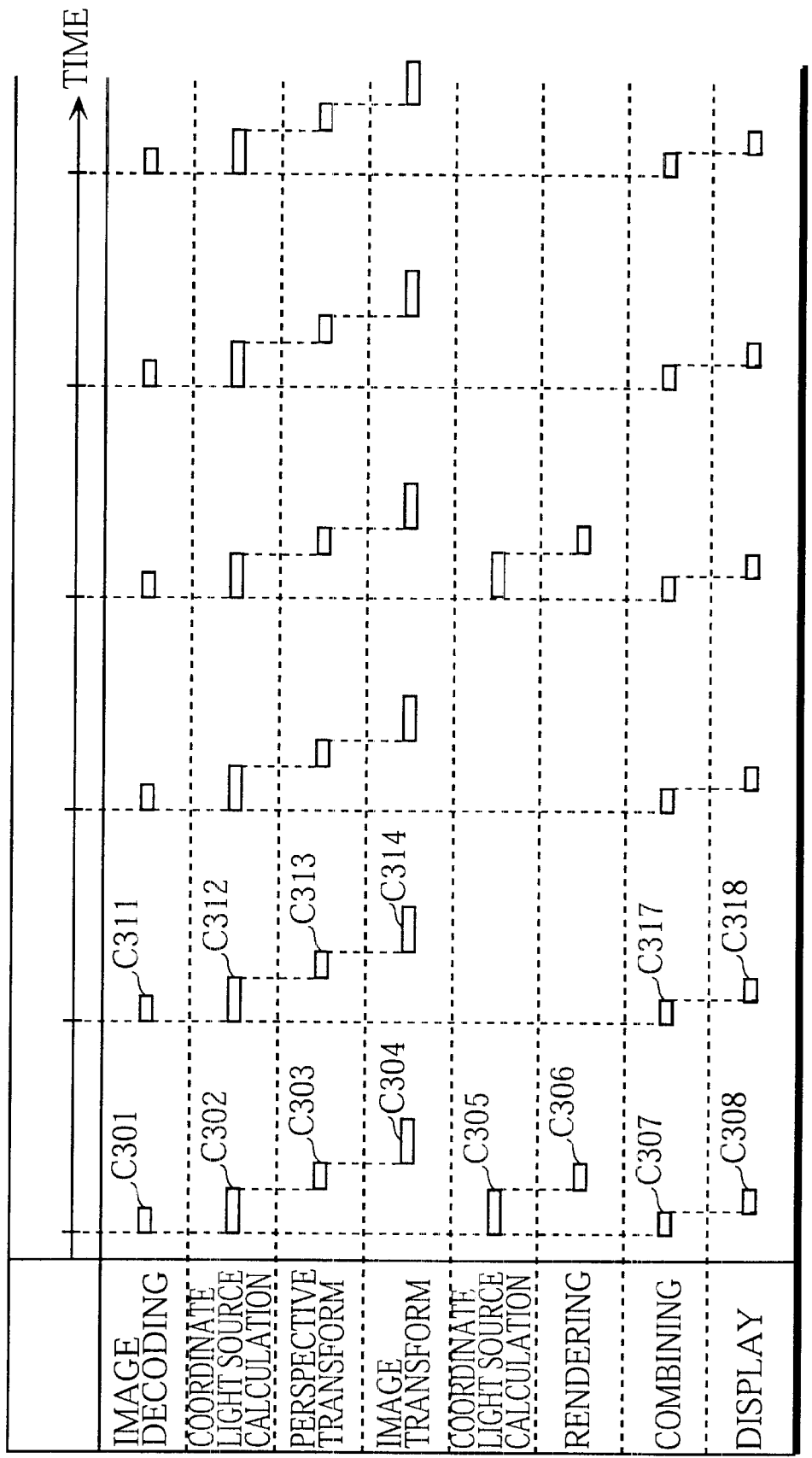
FIG. 24 is a timechart showing the timing of operations performed by the moving image combining apparatus 30.

FIG. 24 is a timechart showing timing for processing performed by various components of the moving image combining apparatus 30. The horizontal axis shows time, and the vertical axis shows processing performed by the various components of the moving image combining apparatus 30.

When a CG image and a video frame are newly generated, and the video frame is pasted onto the CG image, image decoding C301, coordinate light source calculation C302, coordinate light source calculation C305 and combining C307 are simultaneously started. Here, coordinate light source calculation C302 is performed by the coordinate light source calculating unit 103 to calculate 3D coordinates for points in the 3D coordinate space A showing the video display surface, and coordinate light source calculation C305 is performed by the coordinate light source calculating unit 103 to calculate 2D coordinates on the plane H for points forming an object and depth values showing the distance of each point from the plane H in the depth direction. Once coordinate light source calculation C302 is completed, perspective transform C303 is performed, and once this is completed, image transform C304 is performed. Furthermore, once coordinate light source calculation C305 is completed, rendering C306 is performed. Once combining C307 is completed, display C308 takes place.

When a new video frame is generated and pasted onto a previously-generated CG image, image decoding C311, coordinate light source calculation C312 and combining C317 are simultaneously started. Here, coordinate light source calculation C312 is performed by the coordinate light source calculating unit 103 to calculate 3D coordinates in the 3D coordinate space A for points forming the video display surface. Once coordinate light source calculation C312 is completed, perspective transform C313 is performed, and once this is completed, image transform C314 is performed. Once combining C317 is completed, display C318 takes place.

3.3 Summary

As explained above, generation of a CG image, decode/transform processing for a video frame, and combining of the generated CG image and the video frame are performed in parallel using separate processes. This means that computer graphics and a video image can be combined at their respective display rates, and generation of a CG image, decode/transform processing for a video frame, and combining of the generated CG image and the video frame can be performed more quickly.

4 Fourth Embodiment

The following is an explanation of a digital broadcast receiving apparatus 40 in a further alternative to the first embodiment of the present invention.

4.1 Construction of Digital Broadcast Receiving Apparatus 40

The digital broadcast receiving apparatus 40, like the moving image combining apparatus 20, is constructed from a main unit 26, a monitor 21, a remote controller 22, an antenna 23 and the like. The moving image combining apparatus 40 reads object information concerning 3D objects recorded on a CD-ROM, and receives a plurality of broadcast video sequences. The digital broadcast receiving apparatus 40 generates a CG image formed from a plurality of objects, each with a video display surface, pastes a video frame onto each of the video display surfaces in the generated graphic and displays the combined image on the monitor 21.

In the present embodiment, the digital broadcast receiving apparatus 40 receives first, second and third video sequences, and each of first, second and third objects has first, second and third video display surfaces.

Figure 25:
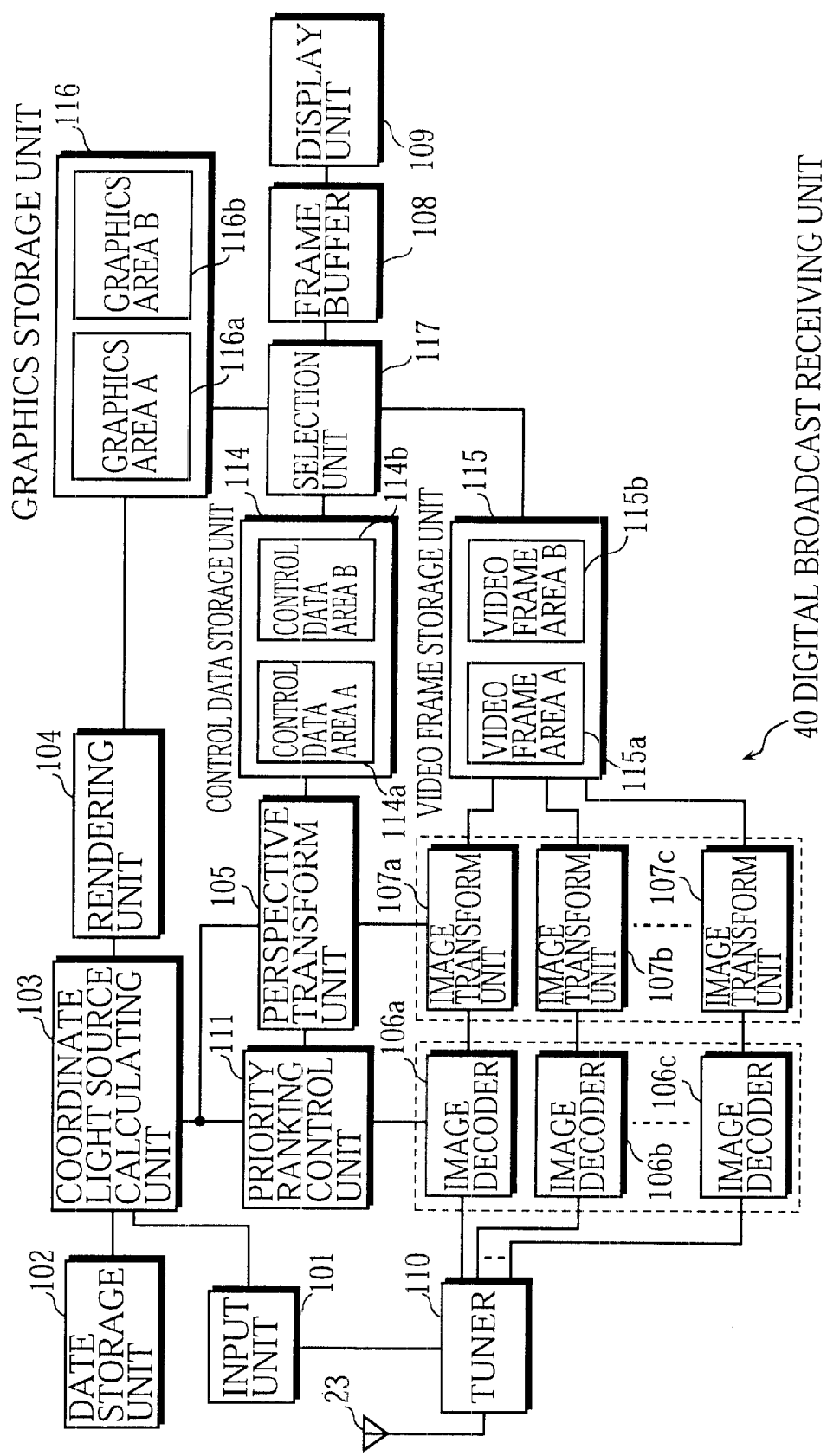
FIG. 25 is a block diagram of a digital broadcast receiving apparatus 40 in a further alternative to the first embodiment of the present invention.

FIG. 25 is a block diagram of the digital broadcast receiving apparatus 40. In the drawing, the digital broadcast receiving apparatus 40 is constructed from an input unit 101, a data storage unit 102, a coordinate light source calculating unit 103, a rendering unit 104, a perspective transform unit 105, image decoders 106a, 106b and 106c, image transform units 107a, 107b and 107c, a frame buffer 108, a display unit 109, a tuner 110, a priority ranking control unit 111, a control data storage unit 114, a video frame storage unit 115, a graphics storage unit 116, a selection unit 117 and an antenna 23.

The components of the digital broadcast receiving apparatus 40 having the same numerical references as components of the digital broadcast receiving apparatus 20 have the same construction. Furthermore, the control data storage unit 114, the video frame storage unit 115, the graphics storage unit 116, and the selection unit 117 are the same as those in the moving image combining apparatus 30. In other words, the digital broadcast receiving apparatus 40 is a combination of the digital broadcast receiving apparatus 20 and the moving image combining apparatus 30.

The following explanation concentrates on the differences from the components of the digital broadcast receiving apparatus 20.

(1) Rendering Unit 104

Rather than outputting generated CG images to the frame buffer 108, the rendering unit 104 outputs them alternately to the graphics areas A116a and B116b.

(2) Perspective Transform Unit 105

The perspective transform unit 105 further generates control data, and outputs the generated control data alternately to the control data areas A114a and B114b, in the same way as the perspective transform unit 105 in the moving image combining apparatus 30.

Here, the control data is, for example, a 640×480 data array, totaling 307 200 items. Each item of control data is formed from two bits and so may be 0, 1, 2, or 3. Each item corresponds to a pixel in the CG image generated by the rendering unit 104.

The perspective transform unit 105 sets values in the control data so that items corresponding to the first video display surface are set at a value of 1, items corresponding to the second video display surface at a value of 2 and items corresponding to the third video display surface at a value of 3. All other items are set at a value of 0. Parts of the control data where a plurality of moving image surfaces overlap are given the value of the uppermost video display surface.

(3) Image Transform Units 107a, 107b, 107c

Rather than outputting transformed video frames to the masking unit 113a, the image transform unit 107a outputs them alternately to the video frame areas A115a and B115b.

The image transform units 107b and 107c are identical to the image transform unit 107a.

(4) Selection Unit 117

The selection unit 117 performs the following processing for item of read control data. If the item is 0, the selection unit 117 reads a pixel at a location corresponding to the item from the pixels making up the read CG image, and writes the read pixel at a corresponding location in the frame buffer 108. If the item is 1, the selection unit 117 reads a pixel at a location corresponding to the item from the pixels making up the first video frame, and writes the read pixel at a corresponding location in the frame buffer 108. If the item is 2, the selection unit 117 reads a pixel at a location corresponding to the item from the pixels making up the second video frame, and writes the read pixel at a corresponding location in the frame buffer 108. If the item is 3, the selection unit 117 reads a pixel at a location corresponding to the item from the pixels making up the third video frame, and writes the read pixel at a corresponding location in the frame buffer 108.

4.2 Operation of Digital Broadcast Receiving Apparatus 40

(1) Data in Each Process Performed by Digital Broadcast Receiving Apparatus 40

Figure 26:
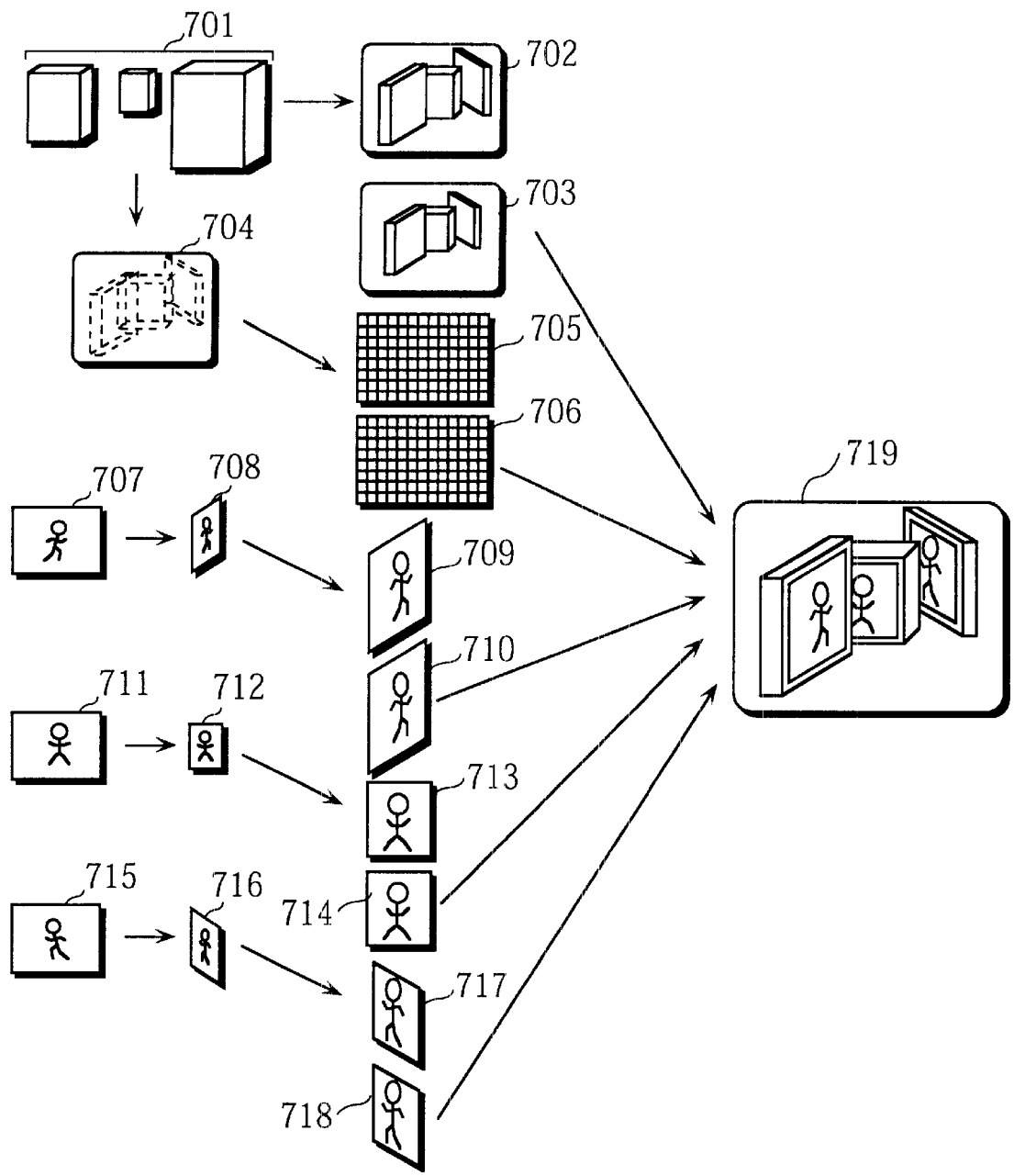
FIG. 26 shows data in each part of the processing performed by the moving image combining apparatus 40.

The following is an explanation of the operation of the digital broadcast receiving apparatus 40 with reference to FIG. 26. The drawing shows data in each process performed by the digital broadcast receiving apparatus 40.

As shown in the drawing, the coordinate light source calculating unit 103 calculates 3D coordinates 704 for points forming objects in the 3D space A using object information 701. The rendering unit 104 performs rendering, forms a CG image 702 as a bitmap image, and outputs the CG image 702 to the graphics area B116b. The perspective transform unit 105 calculates 2D coordinates for points on the plane H forming video display surfaces, generates control data 705, and outputs control data 705 to the control data area B114b. The image transform units 107a to 107c respectively generate transformed video frames 708, 712 and 716 from video frames 707, 711 and 715 respectively, and output the transformed video frames 708, 712 and 716 to the video frame area B115b.

Meanwhile, the selection unit 117 reads a CG image 703 from the graphic image area A116a, video frames 710, 714 and 718 from the video frame area A115a, and control data 706 from the control data area A114a. The selection unit 117 generates a still image 719 using the read control data 706, thereby combining the CG image 703 with the video frames 710, 714 and 718, and writes the still image 719 in the frame buffer 108.

(2) Timing of Various Processing Performed by Digital Broadcast Receiving Apparatus 40

Figure 27:
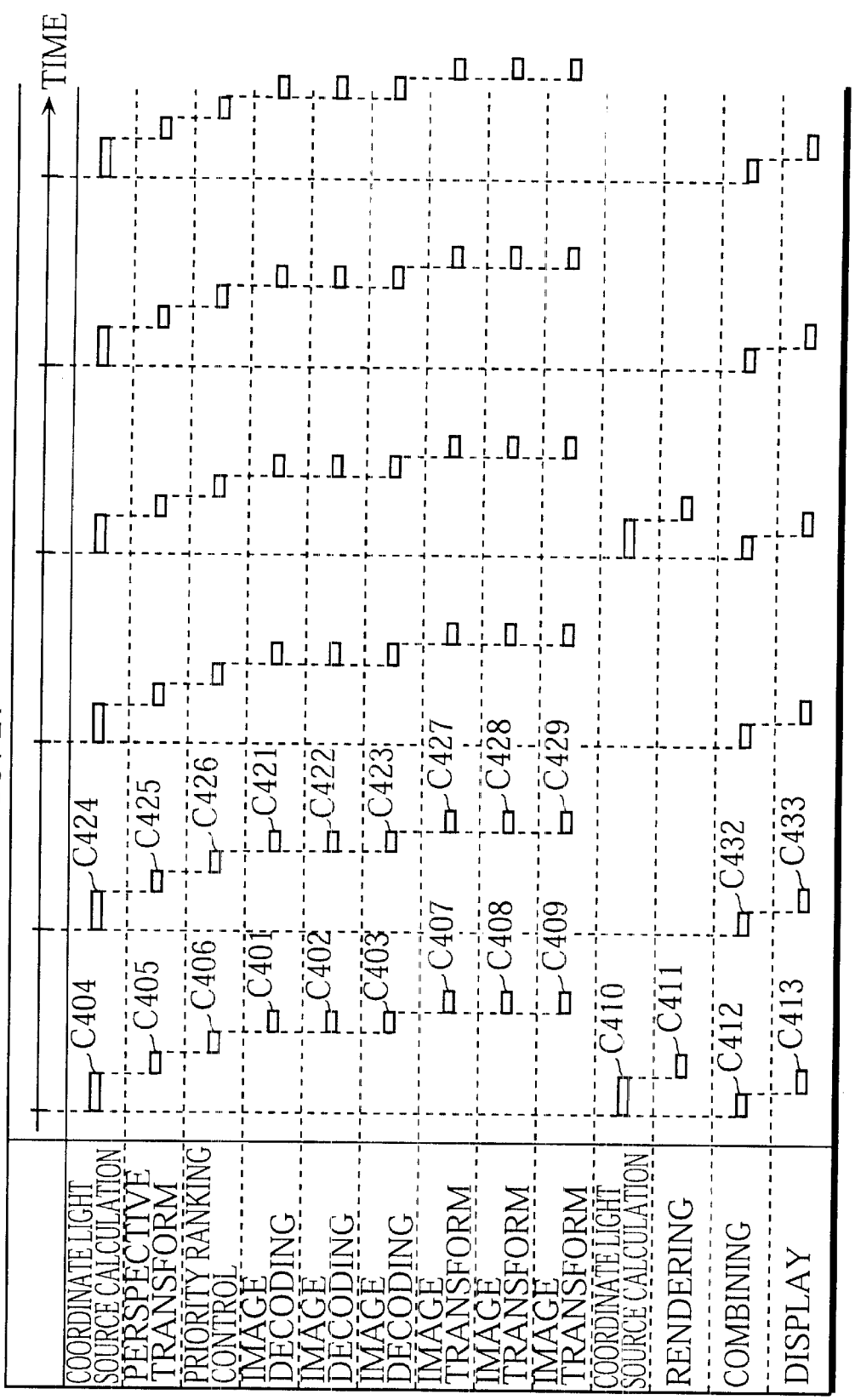
FIG. 27 is a timechart showing the timing of operations performed by the digital broadcast receiving apparatus 40.

FIG. 27 is a timechart showing the timing of processing performed by various components of the digital broadcast receiving apparatus 40. The horizontal axis shows time and the vertical axis shows processing performed by the various components of the digital broadcast receiving apparatus 40.

When a CG image and video frames are newly generated, and the video frames are pasted onto the CG image, coordinate light source calculation C404, coordinate light source calculation C410 and combining C412 are simultaneously started. Here, coordinate light source calculation C404 is performed by the coordinate light source calculating unit 103 to calculate 3D coordinates for points in the 3D coordinate space A showing video display surfaces, and coordinate light source calculation C410 is performed by the coordinate light source calculating unit 103 to calculate 2D coordinates on the plane H for points forming objects, and depth values showing the distance of each point from the plane H in the depth direction. Once the coordinate light source calculation C404 is completed, perspective transform C405 is performed, and once this is completed, priority ranking control C406 is started. Once priority ranking control C406 is completed, the image decoders 106a to 106c start image decoding C401, C402 and C403. Once image decoding C401, C402 and C403 is completed, image transforms C407, C408 and C409 are started. Meanwhile, once coordinate light source calculation C410 is completed, rendering C411 is performed. Once combining C412 is completed, display C413 takes place.

When new video frames are generated and pasted onto a previously-generated CG image, coordinate light source calculation C424 and combining C432 are simultaneously started. Here, coordinate light source calculation C424 is performed by the coordinate light source calculating unit 103 to calculate 3D coordinates in the 3D coordinate space A for points forming the video display surfaces. Once coordinate light source calculation C424 is completed, perspective transform C425 is performed, and once this is completed, priority ranking control C426 is started. Next, once priority ranking control C426 is completed, the image decoders 106a to 106c start image decoding C421, C422 and C423. Once image decoding C421, C422 and C423 is completed, image transforms C427, C428 and C429 are started, and once combining C432 is completed, display C433 takes place.

4.3 Summary

As explained above, generation of a CG image, decode/transform processing for a plurality of video frames, and combining of the generated CG image and the plurality of video frames are performed in parallel using separate processes. This means that computer graphics and images from a plurality of video sequences can be combined at their respective display rates, and generation of a CG image, decode/transform processing for video frames, and combining of the generated CG image and video frames can be performed more quickly. Since a video display surface nearest the front of the 3D coordinate space is given a higher priority ranking, and the corresponding decoder is made to decode the video sequence at a higher frame rate, video images can be displayed with higher quality on video display surfaces with a higher priority ranking.

5 Fifth Embodiment

The following is an explanation of a digital broadcast receiving apparatus 50 in a further alternative to the first embodiment of the present invention.

5.1 Construction of Digital Broadcast Receiving Apparatus 50

The digital broadcast receiving apparatus 50 includes a main unit 26, a monitor 21, a remote controller 22 and an antenna 23, in the same way as the digital broadcast receiving apparatus 20. The digital broadcast receiving apparatus 50 reads object information for 3D objects recorded on a CD-ROM, receives a plurality of video frames, generates a CG image formed from a plurality of objects, each having a video display surface, pastes the video frames onto each video display surface in the CG image and displays the combined image on the monitor 21.

Figure 28:
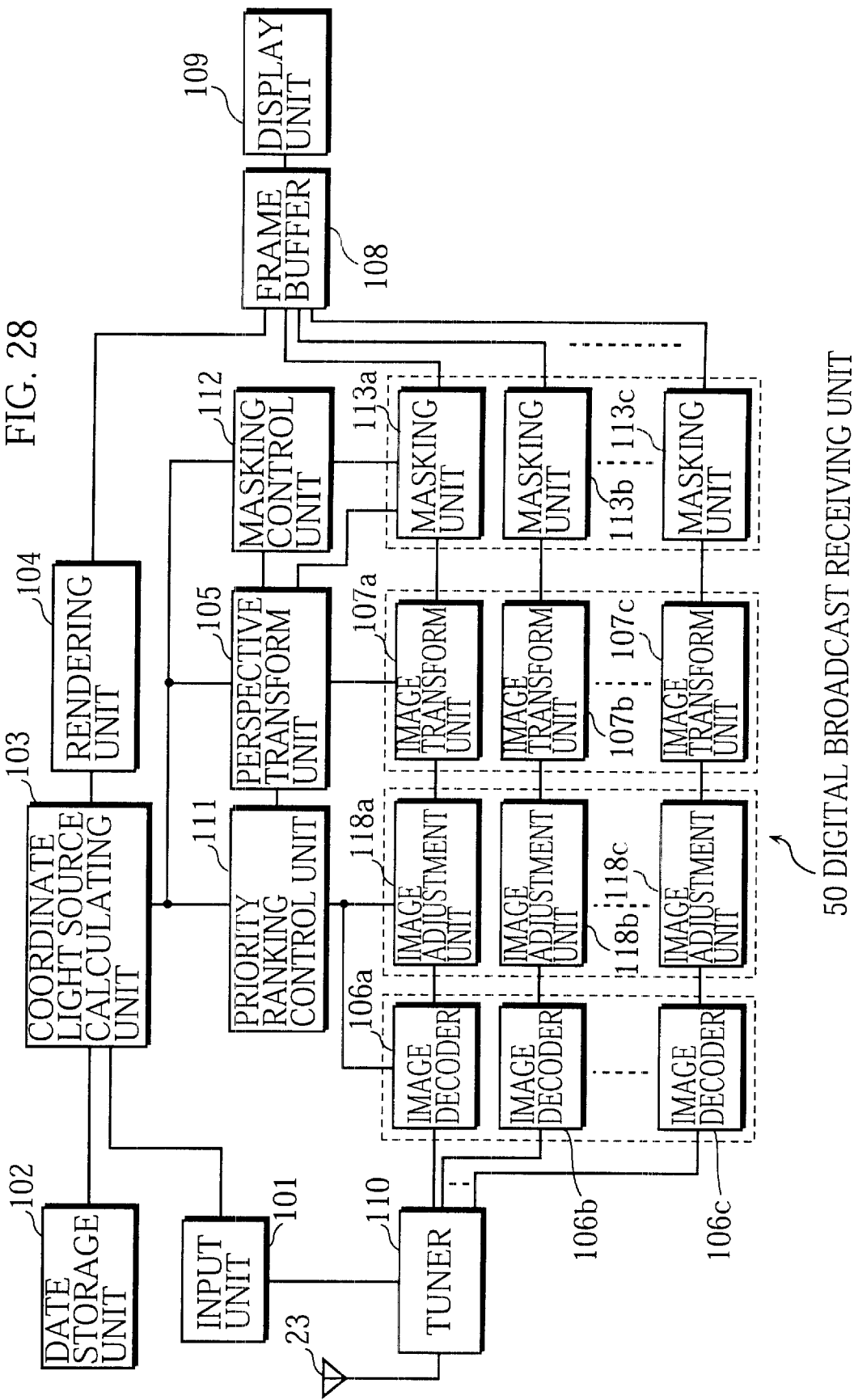
FIG. 28 is a block diagram showing a structure for a digital broadcast receiving apparatus 50 in a further alternative to the first embodiment of the present invention.

FIG. 28 is a block diagram of the digital broadcast receiving apparatus 50. In the drawing, the digital broadcast receiving apparatus 50 is constructed from an input unit 101, a data storage unit 102, a coordinate light source calculating unit 103, a rendering unit 104, a perspective transform unit 105, image decoders 106a, 106b and 106c, image transform units 107a, 107b and 107c, a frame buffer 108, a display unit 109, a tuner 110, a priority ranking control unit 111, a masking control unit 112, masking units 113a, 113b and 113c, image adjustment units 118a, 118b and 118c and an antenna 23.

The components of the digital broadcast receiving apparatus 50 having the same numerical references as components of the digital broadcast receiving apparatus 20 in the second embodiment have the same construction. The following explanation concentrates on the differences between the two embodiments.

(1) Image Decoders 106a, 106b and 106c

Rather than outputting generated video frames to the image transform unit 107a, the image decoder 106a outputs them to the image adjustment unit 118a. In other respects, the image decoder 106a is identical to the image decoder 106a in the digital broadcast receiving apparatus 20.

The image decoders 106b and 106c are identical to the image decoder 106a.

(2) Priority Ranking Control Unit 111

The priority ranking control unit 111 outputs a determined priority ranking to the image adjustment unit 118a to 118c corresponding to the video display surface for each object.

(3) Image Adjustment Units 118a, 118b, 118c.

The image adjustment unit 118a receives a video frame from the image decoder 106a and a determined priority ranking from the priority ranking control unit 111.

When the received priority ranking is the highest possible, the image adjustment unit 118a outputs the received video frame the image transform unit 107a without alteration.

When the received priority ranking is medium or low, the image adjustment unit 118a adjusts the luminance of the video image so that video images with a lower priority ranking have lower luminance. Basically, this means that the value of each pixel in the video frame is divided by an appropriate value. Here, examples of this value are 4 for a medium priority ranking, and 8 for a low priority ranking. Alternatively, when the priority ranking is medium, the pixel value may be shifted one bit downwards, and when it is low, the pixel value may be shifted two bits downwards.

5.2 Summary

As explained above, generation of a CG image, and decode/transform processing for a plurality of video frames are performed in parallel using separate processes, and the generated CG image and the plurality of video frames are combined in the frame buffer. This means that computer graphics and images from a plurality of video sequences can be combined at their respective display rates. Since a video display surface nearest the front of the 3D coordinate space is given a higher priority ranking, and the corresponding image decoder is made to decode the video sequence at a higher frame rate, video images can be displayed with higher quality on video display surfaces with a higher priority ranking. In addition, the luminance of video display surfaces with a low priority ranking is adjusted to a low level, so that flicker is less noticeable for video display surfaces with a low priority ranking likely to have a lower display rate.

6 Further Alternatives (1) The combining of computer graphics and video images explained in the above embodiments may be applied in TV game machines, image reproduction apparatuses such as DVD, video CD and CD players, or in information processing terminals.

(2) In the above embodiments, a video sequence is pasted onto a video display surface of an object, but computer graphics and a video sequence may be displayed side by side on a television screen.

(3) In the above embodiments, the display rate for video images is thirty frames per second, and the display rate for computer graphics is ten frames per second, but different display rates may of course be used. For example, the display rate for video images may be set at ten frames per second and the display rate for computer graphics at thirty frames per second.

(4) In the above embodiments, an object has one video display surface, but an object may have a plurality of video display surfaces.

(5) The invention may alternatively be embodied in a moving image combining method that uses the procedures described in the above embodiments. This moving image combining method may be a moving image combining program executed by a computer, or a computer-readable recording medium recording the moving image combining program. The computer-readable recording medium may be a floppy disk, CD-ROM, DVD-ROM, DVD-RAM, semiconductor memory or similar. The moving image combining program may be transmitted Via a communication path in the form of a digital signal or similar.

(6) The present invention may be formed from any combination of the above plurality of embodiments and alternatives.

INDUSTRIAL APPLICABILITY

The present invention may be used as a user interface for selecting programs in a digital broadcast receiving apparatus receiving digital broadcast waves broadcast on a plurality of channels. It may also be used as an image processing means for producing more advanced images in a TV game machine, an image reproduction apparatus such as a DVD, video CD, or CD player, a personal computer or an information processing terminal.

What is claimed is:

1. A moving image combining apparatus combining computer graphic images (hereafter referred to as CG images) and at least one video sequence composed of a plurality of video frames, the moving image combining apparatus comprising:
an information storage means for storing object information showing an outline and location for at least one object in three-dimensional (3D) space;
a video obtaining means for obtaining from an external source at least one video sequence composed of a plurality of video frames generated at a fixed video display rate;
an image storage means;
a receiving means for receiving position information showing a position of a moving viewpoint;
a graphics generating means for generating CG images one at a time at a graphics display rates and, on completing the generation of a CG image, writing the CG image into the image storage means, the CG image obtaining by projecting each object whose outline and location is shown by the object information onto a projection surface, as seen from a current position of the moving viewpoint shown by the position information; and
a video frame generating step fetching at least one video frame from the at least one video sequence at the video display rate and writing the fetched at least one video frame over a CG image, the CG image being stored in the image storage means immediately prior to the time that the at least one video frame was fetched,
wherein the graphics generating step further performs rendering on each generated CG image, and writes the rendered CG images into the image storage means,
each object includes at least one video display area,
the moving image combining apparatus combines, on at least one video screen located on the projection surface, at least one video sequence and a CG image, each video screen corresponding to a video display area,
the object information includes information showing an outline and location for each video display area,
the graphics generating step further calculates screen information showing an outline and location for each video screen, each video screen obtained by projecting a video display area shown by an outline and location in the object information onto the projection surface, and
the video frame generating step overwrites fetched video frames at each location shown by the screen information, so that each fetched video frame fits an outline shown in the screen information.

2. The moving image combining apparatus of claim 1, wherein:
the video frame generating means generates transformed video frames by transforming the fetched video frames to fit an outline shown in the screen information; and overwrites the transformed video frames into the image storage means.

3. The moving image combining apparatus of claim 2, wherein:
each object has a plurality of video display areas;
the video obtaining means obtains a plurality of video sequences from an external source;
the moving image combining apparatus combines, on each of a plurality of video screens on a projection surface, one of the video sequences with a CG image, each video screen corresponding to one of the plurality of video display areas;
the object information includes information showing outlines and locations for a plurality of video display areas;
the graphics generating means calculates screen information for each piece of information showing the outline and location for one of the plurality of video display areas; and
the video frame generating means fetches video frames from each of the plurality of video sequences, and overwrites fetched video frames from the different video sequences at the different locations shown by the plurality of pieces of screen information, so that the fetched video frames fit the outlines shown in the screen information.

4. The moving image combining apparatus of claim 3, wherein the video frame generating means includes:
a priority ranking determining means for determining a priority ranking for each video screen based on the plurality of pieces of calculated screen information;
a video decoding means for obtaining video frames from each of the plurality of video sequences, based on the determined priority ranking;
a masking location calculating means for calculating locations to be masked on each video screen, based on the plurality of pieces of calculated screen information and the priority ranking determined for each video screen; and a masking means for masking the transformed video frames at the calculated locations,
wherein the video frame generating means overwrites the transformed video frames which have been masked into the image storage means.

5. The moving image combining apparatus of claim 4, wherein the priority ranking determining means determines priority rankings using the plurality of pieces of calculated screen information, with video screens nearer to the viewpoint having a higher priority ranking.

6. The moving image combining apparatus of claim 4, wherein the priority ranking determining means determines priority rankings using the plurality of pieces of calculated screen information, with video screens calculated as having a larger surface area having a higher priority ranking.

7. The moving image combining apparatus of claim 4, wherein the video decoding means obtains all of the video frames from a video sequence with the highest priority ranking, and omits more video frames from video sequences with lower priority rankings.

8. The moving image combining apparatus of claim 4, wherein the video decoding means includes an image quality adjustment unit reducing luminance of obtained video frames, and does not reduce the luminance of video frames from the video sequence with the highest priority ranking, while reducing the luminance of video frames from video sequences with lower priority rankings.

9. A moving image combining apparatus combining three-dimensional CG images and at least one video sequence composed of a plurality of video frames, the moving image combining apparatus comprising:

an information storage means for storing object information showing an outline and location for each object, and an outline and location for at least one video display area for each object, a video obtaining means for obtaining from an external source at least one video sequence composed of a plurality of video frames generated at a fixed video display rate;

a CG image storage means;

a video frame storage means;

an image storage means;

a receiving means for receiving position information showing a position of a moving viewpoint;

a graphics generating means for (1) generating CG images one at a time at a graphics display rate and on completing the generation of a CG image, writing the CG image into the CG image storage means, the CG image obtained by projecting each object whose outline and location is shown by the object information onto a projection surface, as seen from a current position of the moving viewpoint shown by the position information, and (2) calculating screen information showing an outline and location for at least one video screen obtained by projecting each video display area shown by an outline and location in the object information onto the projection surface;

a video frame generating means for fetching at least one video frame from the at least one video sequence at the video display rate and overwriting the fetched at least one video frame into the video frame storage means; and a selecting means for (1) selecting elements forming still images from the at least one video frame written in the video frame storage means and a CG image written in the CG image storage means, the CG image being written in the CG image storage means immediately prior to the time that the at least one video frame was fetched, and (2) writing the selected elements in the image storage means, the CG image storage means includes a first graphics storage unit and a second graphics storage unit;

the video frame storage means includes a first video storage unit and a second video storage unit;

the graphics generating means writes obtained CG images alternatively in the first and second graphics storage units;

the video frame generating means writes obtained video frames alternatively in the first and second graphics storage units; and the selecting means:
(1) reads a CG image from the second graphics storage unit while the graphics generating unit is writing a CG image into the first graphics storage unit, and (b) reads a CG image from the first graphics storage unit while the graphics generating means is writing a CG image into the second graphics storage unit,
(2) reads a video frame from the second video storage unit while the video frame generating unit is writing a video frame into the first video storage unit, and (b) reads a video frame from the first video storage unit while the video frame generating unit is writing a video frame into the second video storage unit, and
(3) selects elements forming still images from the read CG images and video frames, wherein the graphics generating means further performs rendering on each generated CG image, and writes the rendered CG images into the image storage means, the video frame generating means generates transformed video frames by transforming the fetched video frames to fit an outline shown in the screen information; and overwrites the transformed video frames into the image storage means.

10. The moving image combining apparatus of claim 1, wherein:

each object has a plurality of video display areas;

the video obtaining means obtains a plurality of video sequences from an external source;

the moving image combining apparatus combines, on each of a plurality of video screens on a projection surface, one of the video sequences with a CG image, each video screen corresponding to one of the plurality of video display areas;

the object information includes information showing outlines and locations for a plurality of video display areas;

the graphics generating means calculates screen information for each piece of information showing the outline and location for one of the plurality of video display areas; and the video frame generating means fetches video frames from each of the plurality of video sequences, and overwrites fetched video frames from the different video sequences at the different locations shown by the plurality of pieces of screen information, so that the fetched video frames fit the outlines shown in the screen information.

11. The moving image combining apparatus of claim 10, wherein the video frame generating means includes:

a priority ranking determining means for determining a priority ranking for each video screen based on the plurality of pieces of calculated screen information;

a video decoding means for obtaining video frames from each of the plurality of video sequences, based on the determined priority ranking;

a masking location calculating means for calculating locations to be masked on each video screen, based on the plurality of pieces of calculated screen information and the priority ranking determined for each video screen; and a masking means for masking the transformed video frames at the calculated locations, wherein the video frame generating means overwrites the transformed video frames which have been masked into the image storage means.

12. The moving image combining apparatus of claim 11, wherein the priority ranking determining means determines priority rankings using the plurality of pieces of calculated screen information, with video screens nearer to the viewpoint having a higher priority ranking.

13. The moving image combining apparatus of claim 11, wherein the priority ranking determining means determines priority rankings using the plurality of pieces of calculated screen information, with video screens calculated as having a larger surface area having a higher priority ranking.

14. The moving image combining apparatus of claim 11, wherein the video decoding means obtains all of the video frames from a video sequence with the highest priority ranking, and omits more video frames from video sequences with lower priority rankings.

15. The moving image combining apparatus of claim 11, wherein the video decoding means includes an image quality adjustment unit reducing luminance of obtained video frames, and does not reduce the luminance of video frames from the video sequence with the highest priority ranking, while reducing the luminance of video frames from video sequences with lower priority rankings.

16. A moving image combination method for combining CG images and at least one video sequence composed of a plurality of video frames, the moving image combining method used by a moving image combination apparatus having an information storage means and an image storage means, the information storage means storing object information showing an outline and location for at least one object in three-dimensional space, and the moving image combining method comprising:

a video obtaining step obtaining from an external source at least one video sequence composed of a plurality of video frames generated at a fixed video display rate;

a receiving step receiving position information showing a position of a moving viewpoint;

a graphics generating step generating CG images one at a time at a graphics display rate and, on completing the generation of a CG image, writing the CG image into the image storage means, the CG image obtained by projecting each object whose outline and location is shown by the object information onto a projection surface, as seen from a current position of the moving viewpoint shown by the position information; and a video frame generating step fetching at least one video frame from the at least one video sequence at the video display rate and writing the fetched at least one video frame over a CG image, the CG image being stored in the image storage means immediately prior to the time that the at least one video frame was fetched, wherein the graphics generating step further performs rendering on each generated CG image, and writes the rendered CG images into the image storage means, each object includes at least one video display area, the moving image combining apparatus combines, on at least one video screen located on the projection surface, at least one video sequence and a CG image, each video screen corresponding to a video display area, the object information includes information showing an outline and location for each video display area, the graphics generating step further calculates screen information showing an outline and location for each video screen, each video screen obtained by projecting a video display area shown by an outline and location in the object information onto the projection surface, and the video frame generating step overwrites fetched video frames at each location shown by the screen information, so that each fetched video frame fits an outline shown in the screen information.

17. A moving image combining method for combining, on a video display area, CG images and at least one video sequence composed of a plurality of video frames, the moving image combining method used by a moving image combining apparatus having an information storage means, a CG image storage means having a first graphics storage unit and a second graphics storage unit, a video frame storage means having a first video storage unit and a second graphics storage unit, and an image storage means, the information storage means storing object information showing an outline and location for at least one object, and an outline and location for a video screen for each object, in three-dimensional space and the moving image combining method comprising:

a video obtaining step obtaining from an external source at least one video sequence composed of a plurality of video frames generated at a fixed video display rate;

a receiving step receiving position information showing a position of a moving viewpoint;

a graphics generating step (1) generating CG images one at a time at a graphics display rate, rendering on each generated CG image, and, on completing the rendering of a CG image, writing the rendered CG image into alternately the first and second graphics storage unit, the CG images obtained by projecting each object whose outline and location is shown by the object information onto a projection surface, as seen from a current position of the moving viewpoint shown by the position information and (2) calculating screen information showing an outline and location for at least one video screen, the video screen obtained by projecting the at least one video display area shown by an outline and location in the object information onto the projection surface;

a video frame generating step fetching video frames from the video sequence at the video display rate and overwriting the fetched video frame alternately in the first and second graphics storage units;

reading a CG image from the second graphics storage unit while the graphics generating unit is writing a CG image into the first graphics storage unit, and reading a CG image from the first graphics storage unit while the graphics generating means is writing a CG image into the second graphics storage unit;

reading a video frame from the second video storage unit while the video frame generating unit is writing a video frame into the first video storage unit, and reading a video frame from the first video storage unit while the video frame generating unit is writing a video frame into the second video storage unit;

selecting elements forming still images from the read CG images and video frames, the CG image being written in the CG image storage means immediately prior to the time that a video frame was fetched; and writing the selected elements into the image storage means.

18. A recording medium recording a moving image combining program combining CG images and at least one video sequence composed of a plurality of video frames, the moving image combining program used by a computer having an information storage means and an image storage means, the information storage means storing object information showing an outline and location for at least one object in three-dimensional space, and the moving image combining program comprising:

a video obtaining step obtaining from an external source at least one video sequence composed of a plurality of video frames generated at a fixed video display rate;

a receiving step receiving position information showing a position of a moving viewpoint;

a graphics generating step generating CG images one at a time at a graphics display rate and, on completing the generation of a CG image, writing the CG image into the image storage means, the CG image obtained by projecting each object whose outline and location is shown by the object information onto a projection surface, as seen from a current position of the moving viewpoint shown by the position information; and a video frame generating step fetching at least one video frame from the at least one video sequence at the video display rate and writing the fetched at least one video frame over a CG image, the CG image being stored in the image storage means immediately prior to the time that the at least one video frame was fetched, wherein the graphics generating step further performs rendering on each generated CG image, and writes the rendered CG images into the image storage means, each object includes at least one video display area, the computer combines, on at least one video screen located on the projection surface, at least one video sequence and a CG image, each video screen corresponding to a video display area, the object information includes information showing an outline and location for each video display area, the graphics generating step further calculates screen information showing an outline and location for each video screen, each video screen obtained by projecting a video display area shown by an outline and location in the object information onto the projection surface, and the video frame generating step overwrites fetched video frames at each location shown by the screen information, so that each fetched video frame fits an outline shown in the screen information.

19. A recording medium recording a moving image combining program combining, on a video display area, CG images and at one least video sequence composed of a plurality of video frames, the moving image combining program used by a computer having an information storage means, a CG image storage means having a first graphics storage unit and a second graphics storage unit, a video frame storage means having a first video storage unit and a second graphics storage unit, and an image storage means, the information storage means storing object information showing an outline and location for at least one object, and an outline and location for a video screen for each object, in three-dimensional space and the moving image combining method comprising:

a video obtaining step obtaining from an external source at least one video sequence composed of a plurality of video frames generated at a fixed video display rate;

a receiving step receiving position information showing a position of a moving viewpoint;

a graphics generating step (1) generating CG images one at a time at a graphics display rate, rendering on each generated CG image, and, on completing the rendering of a CG image, writing the rendered CG image into alternately the first and second graphics storage unit, the CG images obtained by projecting each object whose outline and location is shown by the object information onto a projection surface, as seen from a current position of the moving viewpoint shown by the position information and (2) calculating screen information showing an outline and location for at least one video screen, the video screen obtained by projecting the at least one video display area shown by an outline and location in the object information onto the projection surface;

a video frame generating step fetching video frames from the video sequence at the video display rate and overwriting the fetched video frame alternately in the first and second graphics storage units;

reading a CG image from the second graphics storage unit while the graphics, generating unit is writing a CG image into the first graphics storage unit, and reading a CG image from the first graphics storage unit while the graphics generating means is writing a CG image into the second graphics storage unit;

reading a video frame from the second video storage unit while the video frame generating unit is writing a video frame into the first video storage unit, and reading a video frame from the first video storage unit while the video frame generating unit is writing a video frame into the second video storage unit;

selecting elements forming still images from the read CG images and video frames, the CG image being written in the CG image storage means immediately prior to the time that a video frame was fetched; and writing the selected elements into the image storage means.

* * * * *